(12) United States Patent
Stampfl et al.

(10) Patent No.: US 12,389,192 B2
(45) Date of Patent: Aug. 12, 2025

(54) TOOL TRACKING SYSTEM

(71) Applicant: MILWAUKEE ELECTRIC TOOL CORPORATION, Brookfield, WI (US)

(72) Inventors: Burtrom L Stampfl, Bristol, WI (US); Kevin W. Stueber, Menomonee Falls, WI (US); Tauhira Hoossainy, Milwaukee, WI (US); Steven Cunningham, Reston, VA (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/459,084

(22) Filed: Aug. 31, 2023

(65) Prior Publication Data

US 2023/0413009 A1 Dec. 21, 2023

Related U.S. Application Data

(60) Division of application No. 17/565,086, filed on Dec. 29, 2021, now Pat. No. 11,778,414, which is a
(Continued)

(51) Int. Cl.
*H04W 24/00* (2009.01)
*H04W 4/02* (2018.01)
(Continued)

(52) U.S. Cl.
CPC ............ *H04W 4/02* (2013.01); *H04W 4/029* (2018.02); *H04W 4/80* (2018.02); *H04W 8/14* (2013.01);
(Continued)

(58) Field of Classification Search
CPC .................... H04N 1/00411; G08B 21/182
(Continued)

(56) References Cited

U.S. PATENT DOCUMENTS 4,688,026 A 8/1987 Scribner et al.
5,260,694 A 11/1993 Remahl
(Continued)

FOREIGN PATENT DOCUMENTS

CN 101809980 A 8/2010
CN 104021453 A 9/2014
(Continued)

OTHER PUBLICATIONS

Aliexpress, "SANWO BLE 4.0 Proximity iBeacon Bluetooth Low Energy Device" <https://www.aliexpress.com/store/product/2010-mah-BLE-4-0-Proximity-iBeacon-Bluetooth-Low-Energy-Device-Ebeoo-Beacon-BLE-4-0/1960711_32593107467.html> website accessed Sep. 9, 2016.
(Continued)

*Primary Examiner* — Marceau Milord
(74) *Attorney, Agent, or Firm* — Michael Best & Friedrich LLP

(57) ABSTRACT

A wireless transmission system logs and communicates a location of an object. The wireless transmission system includes a wireless antenna configured to transmit a first beacon signal and a second advertising beacon signal. The system also includes a processor and a memory that stores instructions executable by the processor. The instructions cause the wireless antenna to repeatedly transmit the first beacon signal through a first number of transmission repetitions spaced at a first repeat interval. After completing the first number of transmission repetitions, the wireless antenna withholds transmission during a transition interval. After the transition interval, the wireless antenna repeatedly transmits the second advertising beacon signal through a second number of transmission repetitions at a second repeat interval. The wireless antenna, memory, and processor may be
(Continued)

integrated in to a mountable housing and attached to an object or integrated with the tool.

15 Claims, 15 Drawing Sheets

Related U.S. Application Data continuation of application No. 16/863,521, filed on Apr. 30, 2020, now Pat. No. 11,218,833, which is a continuation of application No. 16/439,477, filed on Jun. 12, 2019, now Pat. No. 10,694,316, which is a continuation of application No. 15/798,627, filed on Oct. 31, 2017, now Pat. No. 10,368,186.

(60) Provisional application No. 62/415,290, filed on Oct. 31, 2016.

(51) Int. Cl.
  *H04W 4/029* (2018.01)
  *H04W 4/80* (2018.01)
  *H04W 8/14* (2009.01)
  *H04W 64/00* (2009.01)
  *G08C 17/02* (2006.01)
  *H04W 8/00* (2009.01)

(52) U.S. Cl.
  CPC ............ *H04W 64/00* (2013.01); *G08C 17/02* (2013.01); *H04W 8/005* (2013.01)

(58) Field of Classification Search
  USPC ...................................... 340/870.02; 455/425
  See application file for complete search history.

(56) References Cited

U.S. PATENT DOCUMENTS

| | | | |
|---|---|---|---|
| 5,272,324 A | 12/1993 | Blevins | |
| 5,633,875 A | 5/1997 | Hershey et al. | |
| 5,689,238 A | 11/1997 | Cannon, Jr. et al. | |
| 5,689,705 A | 11/1997 | Fino et al. | |
| 5,774,876 A | 6/1998 | Woolley et al. | |
| 5,798,693 A | 8/1998 | Engellenner | |
| 5,939,981 A | 8/1999 | Renney | |
| 5,992,752 A | 11/1999 | Wilz, Sr. et al. | |
| 6,040,774 A | 3/2000 | Schepps | |
| 6,047,264 A | 4/2000 | Fisher et al. | |
| 6,073,169 A | 6/2000 | Shuey et al. | |
| 6,094,164 A | 7/2000 | Murphy | |
| 6,094,642 A | 7/2000 | Stephenson et al. | |
| 6,152,369 A | 11/2000 | Wilz, Sr. et al. | |
| 6,202,062 B1 | 3/2001 | Cameron et al. | |
| 6,246,882 B1 | 6/2001 | Lachance | |
| 6,259,367 B1 | 7/2001 | Klein | |
| 6,321,091 B1 | 11/2001 | Holland | |
| 6,331,817 B1 | 12/2001 | Goldberg | |
| 6,377,296 B1 | 4/2002 | Zlatsin et al. | |
| 6,492,904 B2 | 12/2002 | Richards | |
| 6,550,674 B1 | 4/2003 | Neumark | |
| 6,581,045 B1 | 6/2003 | Watson | |
| 6,614,351 B2 | 9/2003 | Mann et al. | |
| 6,693,539 B2 | 2/2004 | Bowers et al. | |
| 6,742,045 B1 | 5/2004 | Albert et al. | |
| 6,745,027 B2 | 6/2004 | Twitchell, Jr. | |
| 6,772,130 B1 | 8/2004 | Karbowski et al. | |
| 6,774,811 B2 | 8/2004 | Kaufman et al. | |
| 6,816,075 B2 | 11/2004 | Grunes et al. | |
| 6,850,839 B1 | 2/2005 | McGibney | |
| 6,900,732 B2 | 5/2005 | Richards | |
| 6,901,304 B2 | 5/2005 | Swan et al. | |
| 6,967,577 B2 | 11/2005 | Taylor et al. | |
| 6,970,088 B2 | 11/2005 | Kovach | |
| 6,982,656 B1 | 1/2006 | Coppinger et al. | |
| 7,005,968 B1 | 2/2006 | Bridgelall | |
| 7,019,650 B2 | 3/2006 | Volpi et al. | |
| 7,075,412 B1 | 7/2006 | Reynolds et al. | |
| 7,076,441 B2 | 7/2006 | Hind et al. | |
| 7,084,765 B2 | 8/2006 | Clapper | |
| 7,084,769 B2 | 8/2006 | Bauer et al. | |
| 7,124,028 B2 | 10/2006 | Ray et al. | |
| 7,148,801 B2 | 12/2006 | Crabtree et al. | |
| 7,155,238 B2 | 12/2006 | Katz | |
| 7,170,407 B2 | 1/2007 | Wagner | |
| 7,177,651 B1 | 2/2007 | Almassy | |
| 7,181,170 B2 | 2/2007 | Love et al. | |
| 7,181,228 B2 | 2/2007 | Boesch | |
| 7,200,616 B2 | 4/2007 | Takeuchi et al. | |
| 7,277,009 B2 | 10/2007 | Hall et al. | |
| 7,319,412 B1 | 1/2008 | Coppinger et al. | |
| 7,330,856 B2 | 2/2008 | Nicastro et al. | |
| 7,336,181 B2 | 2/2008 | Nowak et al. | |
| 7,346,015 B2 | 3/2008 | Shipman | |
| 7,359,358 B2 | 4/2008 | Shipman | |
| 7,366,522 B2 | 4/2008 | Thomas | |
| 7,385,509 B2 | 6/2008 | Taylor et al. | |
| 7,391,326 B2 | 6/2008 | Puzio et al. | |
| 7,398,153 B2 | 7/2008 | Workman et al. | |
| 7,420,465 B2 | 9/2008 | Ritter | |
| 7,446,702 B2 | 11/2008 | Huang et al. | |
| 7,525,484 B2 | 4/2009 | Dupray et al. | |
| 7,535,881 B2 | 5/2009 | Maekawa et al. | |
| 7,584,165 B2 | 9/2009 | Buchan | |
| 7,675,410 B2 | 3/2010 | Aritsuka et al. | |
| 7,702,654 B2 | 4/2010 | Richards et al. | |
| 7,750,811 B2 | 7/2010 | Puzio et al. | |
| 7,764,231 B1 | 7/2010 | Karr et al. | |
| 7,786,844 B2 | 8/2010 | Ehrman et al. | |
| D638,317 S | 5/2011 | Nguyen et al. | |
| RE42,435 E | 6/2011 | Katz | |
| 7,969,306 B2 | 6/2011 | Ebert et al. | |
| 8,004,397 B2 | 8/2011 | Forrest et al. | |
| 8,018,912 B2 | 9/2011 | Habetha | |
| 8,081,072 B2 | 12/2011 | Scalisi et al. | |
| D656,424 S | 3/2012 | Bentley | |
| 8,305,946 B2 | 11/2012 | Kubo | |
| 8,320,939 B1 | 11/2012 | Vincent | |
| 8,428,079 B1 | 7/2013 | Lambert et al. | |
| 8,509,412 B2 | 8/2013 | Sheha et al. | |
| 8,526,884 B1 | 9/2013 | Price et al. | |
| 8,570,168 B2 | 10/2013 | Logan et al. | |
| D693,709 S | 11/2013 | Lee et al. | |
| 8,666,936 B2 | 3/2014 | Wallace | |
| 8,686,853 B2 | 4/2014 | Pfuhl | |
| D723,957 S | 3/2015 | Evans et al. | |
| 9,111,234 B2 | 8/2015 | Wallace et al. | |
| 9,282,582 B1 | 3/2016 | Dunsbergen et al. | |
| 9,307,355 B2 | 4/2016 | Nehrenz et al. | |
| 9,591,570 B2 * | 3/2017 | Kubo | H04W 4/80 |
| 9,622,208 B2 | 4/2017 | Mycek et al. | |
| D786,724 S | 5/2017 | Seagle, Jr. | |
| 9,826,351 B2 * | 11/2017 | Klimek | G01S 5/0294 |
| 9,826,356 B2 * | 11/2017 | Mycek | H04B 17/318 |
| 9,860,730 B2 | 1/2018 | Mani et al. | |
| 9,888,300 B2 | 2/2018 | Stampfl et al. | |
| D818,854 S | 5/2018 | Kachar et al. | |
| 10,028,105 B1 | 7/2018 | Swart | |
| 10,149,132 B2 | 12/2018 | Kim et al. | |
| 10,165,046 B2 | 12/2018 | Yang et al. | |
| 10,311,352 B2 | 6/2019 | Cannell et al. | |
| 10,368,186 B2 | 7/2019 | Stampfl et al. | |
| 10,572,700 B2 * | 2/2020 | Sengstaken, Jr. | G08B 7/06 |
| 10,694,316 B2 | 6/2020 | Stampfl et al. | |
| 2002/0004753 A1 | 1/2002 | Perkowski | |
| 2002/0014955 A1 | 2/2002 | Klitsgaard | |
| 2002/0042736 A1 | 4/2002 | Wang et al. | |
| 2003/0034887 A1 | 2/2003 | Crabtree et al. | |
| 2003/0050871 A1 | 3/2003 | Broughton | |
| 2003/0060212 A1 | 3/2003 | Thomas | |
| 2003/0101127 A1 | 5/2003 | Cornelius | |
| 2003/0126136 A1 | 7/2003 | Omoigui | |
| 2003/0132855 A1 | 7/2003 | Swan | |
| 2003/0229559 A1 | 12/2003 | Panttaja et al. | |

(56) References Cited

U.S. PATENT DOCUMENTS

| | | |
|---|---|---|
| 2004/0015367 A1 | 1/2004 | Nicastro et al. |
| 2004/0085207 A1 | 5/2004 | Kreiner et al. |
| 2004/0124944 A1 | 7/2004 | Nation |
| 2004/0124977 A1 | 7/2004 | Biffer |
| 2004/0217864 A1 | 11/2004 | Nowak et al. |
| 2005/0021449 A1 | 1/2005 | Sweeney |
| 2005/0200478 A1 | 9/2005 | Koch et al. |
| 2006/0255935 A1 | 11/2006 | Scalisi et al. |
| 2007/0120698 A1 | 5/2007 | Turk et al. |
| 2007/0250932 A1 | 10/2007 | Kothari |
| 2007/0260759 A1 | 11/2007 | Scott |
| 2007/0261100 A1 | 11/2007 | Greeson et al. |
| 2007/0276799 A1* | 11/2007 | Kalervo .................. G06F 16/95 |
| 2008/0018912 A1 | 1/2008 | Schreiber |
| 2008/0086391 A1 | 4/2008 | Maynard et al. |
| 2008/0086509 A1 | 4/2008 | Wallace |
| 2008/0172173 A1 | 7/2008 | Chang et al. |
| 2008/0174484 A1 | 7/2008 | Katz |
| 2008/0291004 A1 | 11/2008 | Regan et al. |
| 2009/0143079 A1 | 6/2009 | Klassen et al. |
| 2009/0153305 A1 | 6/2009 | Ambrosetti |
| 2010/0260158 A1 | 10/2010 | Naito et al. |
| 2010/0278077 A1 | 11/2010 | Reunamaki et al. |
| 2011/0285506 A1 | 11/2011 | Hillis |
| 2012/0111589 A1 | 5/2012 | Schmidt et al. |
| 2013/0030931 A1* | 1/2013 | Moshfeghi ............... H04B 5/73 |
| | | 705/16 |
| 2013/0109375 A1 | 5/2013 | Zeiler et al. |
| 2013/0187759 A1 | 7/2013 | Salour et al. |
| 2014/0016568 A1 | 1/2014 | Koskela et al. |
| 2014/0023049 A1 | 1/2014 | Strecker et al. |
| 2014/0044305 A1 | 2/2014 | Scavezze et al. |
| 2014/0132411 A1 | 5/2014 | Buchheim et al. |
| 2014/0148099 A1 | 5/2014 | Reunamaki et al. |
| 2014/0149416 A1 | 5/2014 | Wallace |
| 2014/0213301 A1* | 7/2014 | Evans ................... H04W 4/029 |
| | | 455/456.6 |
| 2014/0218238 A1 | 8/2014 | Cooke et al. |
| 2014/0240125 A1 | 8/2014 | Burch et al. |
| 2014/0332596 A1 | 11/2014 | Sakanashi |
| 2014/0370909 A1 | 12/2014 | Natucci, Jr. et al. |
| 2015/0005002 A1 | 1/2015 | Boulay et al. |
| 2015/0084745 A1 | 3/2015 | Hertz et al. |
| 2015/0097674 A1 | 4/2015 | Mondal et al. |
| 2015/0105099 A1* | 4/2015 | Luo ....................... H04W 64/00 |
| | | 455/456.1 |
| 2015/0162646 A1 | 6/2015 | Kawase et al. |
| 2015/0277428 A1 | 10/2015 | Dackefjord |
| 2015/0289207 A1* | 10/2015 | Kubo ................... H04W 4/029 |
| | | 370/311 |
| 2016/0144826 A1 | 5/2016 | Nelson et al. |
| 2016/0182170 A1 | 6/2016 | Daoura et al. |
| 2016/0249168 A1 | 8/2016 | Evans et al. |
| 2016/0249293 A1 | 8/2016 | Lee |
| 2016/0373894 A1 | 12/2016 | Evans et al. |
| 2016/0373929 A1 | 12/2016 | Stirling |
| 2017/0061404 A1* | 3/2017 | Tunnell ................ G06Q 20/327 |
| 2017/0134898 A1* | 5/2017 | Vega ..................... H04W 12/30 |
| 2017/0164156 A1 | 6/2017 | Evans et al. |
| 2017/0228566 A1* | 8/2017 | Sengstaken, Jr. .. G06K 19/0717 |
| 2017/0359769 A1 | 12/2017 | Martono et al. |
| 2018/0025603 A1 | 1/2018 | Tyler et al. |
| 2018/0035356 A1 | 2/2018 | Gupta et al. |
| 2018/0063784 A1 | 3/2018 | Abraham et al. |
| 2018/0124558 A1 | 5/2018 | Stampfl et al. |
| 2018/0295466 A1 | 10/2018 | Cannell et al. |
| 2018/0357523 A1 | 12/2018 | Freienstein et al. |
| 2019/0208468 A1 | 7/2019 | Kaushik |
| 2020/0260215 A1 | 8/2020 | Stampfl et al. |

FOREIGN PATENT DOCUMENTS

| | | |
|---|---|---|
| CN | 104268803 A | 1/2015 |
| CN | 208768308 U | 4/2019 |
| DE | 102009023902 A1 | 12/2010 |
| EP | 748080 A1 | 12/1996 |
| EP | 2068120 A1 | 6/2009 |
| JP | 2002046821 A | 2/2002 |
| WO | 106401 A1 | 1/2001 |
| WO | 148505 A2 | 7/2001 |
| WO | 2014005004 A1 | 1/2014 |
| WO | 2016206859 A1 | 12/2016 |

OTHER PUBLICATIONS

Amazon, "iBeacon Bluetooth Low Energy 4.0 Device by lotton" <http://www.amazon.com/gp/product/B01AHO8EIS?psc=1&redirect=true&ref_=oh_aui_detailpage_001_s00> website accessed Sep. 9, 2016.

Amazon, Diymall Ibeacon Module Bluetooth 4.0 BLE Support Near-field Positioning Sensor Wireless Acquisition<http://amazon.com/B0002UDZU6> website accessed Sep. 9, 2016.

Bosch, "Track My Tools" <https://www.bosch-professional.com/service/trackmytools/de/de/> website accessed Sep. 9, 2016.

Estimote, "Beacon Tech Overview—Developer Docs," <http://developer.estimote.com/> website accessed Oct. 11, 2016.

Estimote, "Estimote Beacons" <http://estimote.com/> website accessed Sep. 9, 2016.

Estimote, "Estimote Stickers" <http://estimote.com/> website accessed Sep. 9, 2016.

Lasso Tag, "Tag it! Secure it! Keep it! Tie it to ya!" <http://lassotag.com/> website accessed Sep. 9, 2016.

Onyx Beacon, "Beacon One" <http://www.onyxbeacon.com/beacon-hardware/> website accessed Sep. 9, 2016.

Onyx Beacon, "Enterprise Beacon" <http://www.onyxbeacon.com/beacon-hardware/> website accessed Sep. 9, 2016.

Pixie, "Locate lost keys, remotes and more with Pixie!" <https://www.getpixie.com/> website accessed Sep. 9, 2016.

Radbeacon Dot, "BLE AltBeacon and iBeacon Proximity Beacons, Developer Kit, and Accessories" <http://store.radiusnetworks.com/collections/ibeacon/products/radbeacon-dot> website accessed Sep. 9, 2016.

Sensor Bug, "SensorBug Low Profile Universal Wireless Sensor" <http://www.blehome.com/sensorbug-lp.html> website accessed Sep. 9, 2016.

Social Retail, "IBeacons" <http://www.digitalsocialretail.com/beacons/> website accessed Sep. 9, 2016.

Tile, "Tile's Bluetooth Tracker" <https://www.thetileapp.com/> website accessed Sep. 9, 2016.

TrackR, "Track your phone, wallet, keys & anything else withTrackR!" <https://www.thetrackr.com/> website accessed Sep. 9, 2016.

Xy, "The Findables Company" <http://www.xyfindit.com/> website accessed Sep. 9, 2016.

Youtube, "Watch how Pixie Points are made iPhone" <https://youtu.be/NeMF1K4QWbE> website accessed Sep. 9, 2016.

Co-pending U.S. Appl. No. 29/580,561, filed Oct. 11, 2016.

Brewer et al., "Intelligent tracking in manufacturing," Journal of Intelligent Manufacturing, 1999, 10, 245-250.

Gomez et al., "Overview and Evaluation of Bluetooth Low Energy: An Emerging Low-Power Wireless Technology," Sensors, 2012, 12, 11734-11753; doi:10.3390/s120911734.

Bustamante, "Finite State Machines, Wizards, and the Web," <https://msdn.microsoft.com/en-us/library/aa478972(d=printer).aspx> Feb. 2004, (20 pages).

Vadhia et al., "IPV6 vs EPC Presentation," Silicon Valley World Internet Center Feb. 12, 2004 (21 pages).

Hill et al., "Automatic Identification and Data Collection: Scanning Into the Future," <http://www.ascet.com/> ASCET, Apr. 2000, 2, 269-272.

Huvio et al., "Tracking and Tracing Parcels Using a Distributed Computing Approach," Norwegian University of Science and Technology (NTNU) 2003, 1-15.

Craft, Jr. "Secure Integration of Radio Frequency Indentification (RFID) Technology into a Supply Chain Thesis," Naval Postgraduate School, Monterey, CA, Sep. 2005 (112 pages).

(56) References Cited

OTHER PUBLICATIONS

Peters et al., "Finding Lost Objects: Informing the Design of Ubiquitous Computing Services for the Home," Georgia Institute of Technology, 2004, 1-8.
International Search Report and Written Opinion for Application No. PCT/US2017/059174 dated Feb. 22, 2018, 11 pages.
Chinese Patent Office Action for Application No. 202110881851.1 dated Jul. 1, 2023 (8 pages including English summary).

\* cited by examiner

TOOL TRACKING SYSTEM

RELATED APPLICATIONS

This application is a divisional of U.S. patent application Ser. No. 17/565,086, filed on Dec. 29, 2021, which is a continuation of U.S. patent application Ser. No. 16/863,521, filed on Apr. 30, 2020, now U.S. Pat. No. 11,218,833, which is a continuation of U.S. patent application Ser. No. 16/439,477, filed on Jun. 12, 2019, now U.S. Pat. No. 10,694,316, which is a continuation of U.S. patent application Ser. No. 15/798,627, filed on Oct. 31, 2017, now U.S. Pat. No. 10,368,186, which makes reference to, claims priority to, and claims the benefit of U.S. Provisional Patent Application No. 62/415,290, filed on Oct. 31, 2016, all of which are incorporated herein by reference in their entirety.

FIELD OF THE INVENTION

The present invention relates to communication and logging of location for tools and other devices.

SUMMARY

In some embodiments, a signaling method is used to communicate and log the location of a tool. In some embodiments, the method includes repeatedly transmitting, by a a beacon transmitter, a first beacon signal through a first number of transmission repetitions spaced at a first repeat interval. After completing the first number of transmission repetitions, the beacon transmitter withholds transmission during a transition interval. The method further includes repeatedly transmitting, by the beacon transmitter, a second advertising beacon signal through a second number of transmission repetitions at a second repeat interval.

In some embodiments, the first repeat interval is of a length different from a length of the second repeat interval. In some embodiments, the first repeat interval is of a fixed length different from a fixed length of the second repeat interval. In some embodiments, the first beacon signal is a signal for alerting a receiving application to the presence of the beacon transmitter the second advertising beacon signal. In some embodiments, the second advertising beacon signal is a signal for providing identification of the beacon transmitter transmitting the second advertising beacon signal. In some embodiments, the first beacon signal is a signal using a first open protocol for alerting a receiving application to the presence of the beacon transmitter transmitting the second advertising beacon signal. In some embodiments, the second advertising beacon signal is a signal using a second proprietary protocol for providing identification of the beacon transmitter transmitting the second advertising beacon signal. In some embodiments, the first repeat interval is of a length that is less than $1/50^{th}$ of a length of the second repeat interval. In some embodiments, after completing the second number of transmission repetitions, the beacon transmitter returns to the repeatedly transmitting the first beacon signal through the first number of transmission repetitions spaced at the first repeat interval.

In some embodiments, a wireless signal transmission system is provided including a transmitter and a memory. The transmitter is configured to transmit a first beacon signal and a second advertising beacon signal. The memory stores instructions executable on a processor to cause the transmitter to repeatedly transmit the first beacon signal through a first number of transmission repetitions spaced at a first repeat interval; after completing the first number of transmission repetitions, withhold transmission during a transition interval; and repeatedly transmit the second advertising beacon signal through a second number of transmission repetitions at a second repeat interval.

In some embodiments of the system, the first repeat interval is of a length different from a length of the second repeat interval. In some embodiments of the system, the first beacon signal is a signal for alerting a receiving application to the presence of the beacon transmitter transmitting the second advertising beacon signal, and the second advertising beacon signal is a signal for providing identification of the beacon transmitter transmitting the second advertising beacon signal. In some embodiments of the system, the first beacon signal is a signal using a first open protocol for alerting a receiving application to the presence of the beacon transmitter transmitting the second advertising beacon signal, and the second advertising beacon signal is a signal using a second proprietary protocol for providing identification of the beacon transmitter transmitting the second advertising beacon signal. In some embodiments of the system, the first repeat interval is of a length that is less than $1/50^{th}$ of a length of the second repeat interval.

In some embodiments, a location recording method is provided. The method includes receiving, wirelessly by a personal wireless device having an electronic processor, a first beacon signal. The method further includes, responsive to receiving the first beacon signal, activating a dormant transmitter location logging application on the electronic processor of the personal wireless device. The transmitter location logging application then listens for a second advertising beacon signal. The personal wireless device receives, wirelessly, the second advertising beacon signal. Responsive to receiving the second advertising beacon signal, a location of a transmitter that transmitted the second advertising beacon signal is logged.

In some embodiments, the first beacon signal is a signal for alerting a receiving application of the personal wireless device to the presence of a beacon transmitter transmitting the second advertising beacon signal, and the second advertising beacon signal is a signal for providing identification of the beacon transmitter transmitting the second advertising beacon signal.

In some embodiments, the first beacon signal is a signal using a first open protocol for alerting a receiving application to the presence of a beacon transmitter transmitting the second advertising beacon signal, and the second advertising beacon signal is a signal using a second proprietary protocol for providing identification of the beacon transmitter transmitting the second advertising beacon signal. In some embodiments, the method further includes an operating system of a personal wireless device receiving the first beacon signal, wherein the activating the dormant transmitter location logging application further comprises the operating system activating the dormant transmitter location logging application. In some embodiments, the logging a location of the transmitter that transmitted the second advertising beacon signal further comprises reporting to an external database an identity and a location of the transmitter that transmitted the second advertising beacon. In some embodiments, the method further includes waiting through a first number of transmission repetitions spaced at a first repeat interval; after the first number of transmission repetitions, waiting during a transition interval; and receiving the second advertising beacon signal through a second number of transmission repetitions at a second repeat interval.

Other aspects of the invention will become apparent by consideration of the detailed description and accompanying drawings.

DETAILED DESCRIPTION

Figure 1A:
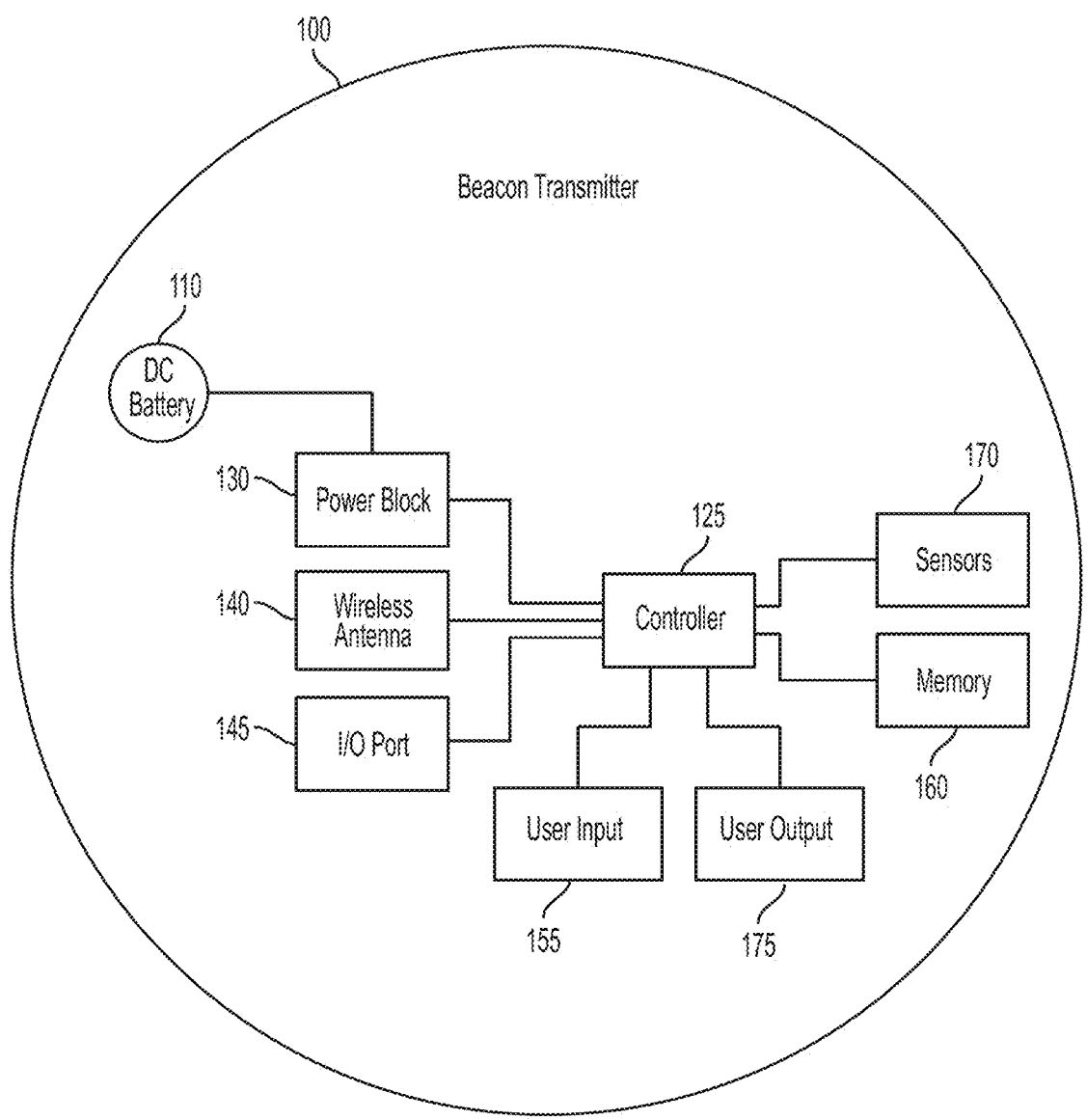
FIG. 1A illustrates a diagram of a beacon transmitter for location reporting according to embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components. In some instances, the controllers described in the specification may be implemented in one of or a combination of a general processor, an application specific integrated circuit (ASIC), a digital signal processor (DSP), a field programmable gate array (FPGA), or the like.

FIG. 1A illustrates a beacon transmitter 100 for location reporting according to embodiments of the invention. The beacon transmitter 100, also referred to as a transmitting device, includes a battery 110 (also referred to as a power source), a controller 125, a power block 130, a wireless antenna 140, an input/output (I/O) port 145, a memory 160, user input 155, sensors 170, and user output 175. As described in further detail below, the beacon transmitter repeatedly transmits, via the wireless antenna 140, a first beacon signal and a second advertising beacon signal according to a transmission pattern, which, in some embodiments, enables power-efficient location tracking of the beacon transmitter 100 and objects to which it is attached.

The battery 110 provides direct current (DC) power to the power block 130. The battery 110 includes a housing within which is one or more battery cells, such as lithium ion ("Li-ion") cells, Nickel-Cadium ("Ni-Cad") cells, or cells of another chemistry type. In some embodiments, the battery 110 is a coin cell battery. In some embodiments, the beacon transmitter 100 includes another power source in addition to the battery 110 or in place of the battery 110, such as a circuit for connection to alternating current power (e.g., including a rectifier), photovoltaic cells and related circuitry for solar-based power generation, or a wind-based power generator.

The power block 130 is coupled to the battery 110 via the terminals (not shown) of the battery 110 and matching terminals (not shown) of the power block 130. The power block 130 provides DC power to components of the beacon transmitter 100. The power block 130 may include power regulating and conversion circuitry to ensure that the power provided to various components of the beacon transmitter 100 is at the appropriate level(s).

The controller 125 is further coupled to the wireless antenna 140 and the input/output (I/O) port 145. As will be described in greater detail below, the power block 130, wireless antenna 140, and I/O port 145 enable the beacon transmitter 100 to communicate with external devices and may be collectively referred to as a physical interface.

The controller 125, which may be an electronic processor, is in communication with the memory 160. In some embodiments, the memory 160 stores and provides to the controller 125 for transmission the data making up the first beacon signal and the second advertising beacon signal, which are described in further detail below. The memory 160 further includes, among other elements, instructions that are executed by the controller 125 to control the functions of the beacon transmitter 100 described herein. Although the instructions are described as software stored in memory 160 and executed by the controller 125, the instructions may be implemented in part or wholly in hardware of the controller 125 or outside of the controller 125. For example, the instructions may be implemented by one or more separate digital signal processors (DSPs) or general purpose processors executing the instructions, or by one or more field programmable gate arrays (FPGAs) or application specific integrated circuits (ASICs). Although the memory 160 is shown as a singular unit, the memory 160 may be made up of various memories individually coupled to the controller 125 or coupled to the controller 125 via a bus. Additionally, portions of the memory 160 may be embedded within the controller 125. For instance, parameters such as a status of battery 110 may be stored within a memory of the controller 125. The data stored in the memory 160 described herein may be provided from an external computing device via the wireless antenna 140 or I/O port 145 and stored in the memory 160 by the controller 125.

The user input 155 and sensors 170 include one or more of buttons, microphones, accelerometers, temperature sensors, humidity sensors, and light sensors capable of detecting external stimuli from the environment or the user. The user output 175 includes one or more of LEDs, a speaker, a vibrating element, etc. to inform the user of the status of the beacon transmitter 100. For example, if an error occurs, such as low battery power, the beacon transmitter 100 may output an audible alert, an LED may flash, and/or the vibrating element may provide tactile feedback to the user. The user output 175 may be controlled by output signals from the controller 125.

The controller 125 is further coupled to the wireless antenna 140 and the I/O port 145. As described in further detail below, the controller 125 may transmit wireless communications via the wireless antenna 140 and may receive wireless communications via the wireless antenna 140. The I/O port 145 may include a wired connection for the beacon transmitter 100 to enable, for example, programming of the beacon transmitter 100 or data export from the beacon transmitter 100.

Figure 1B:
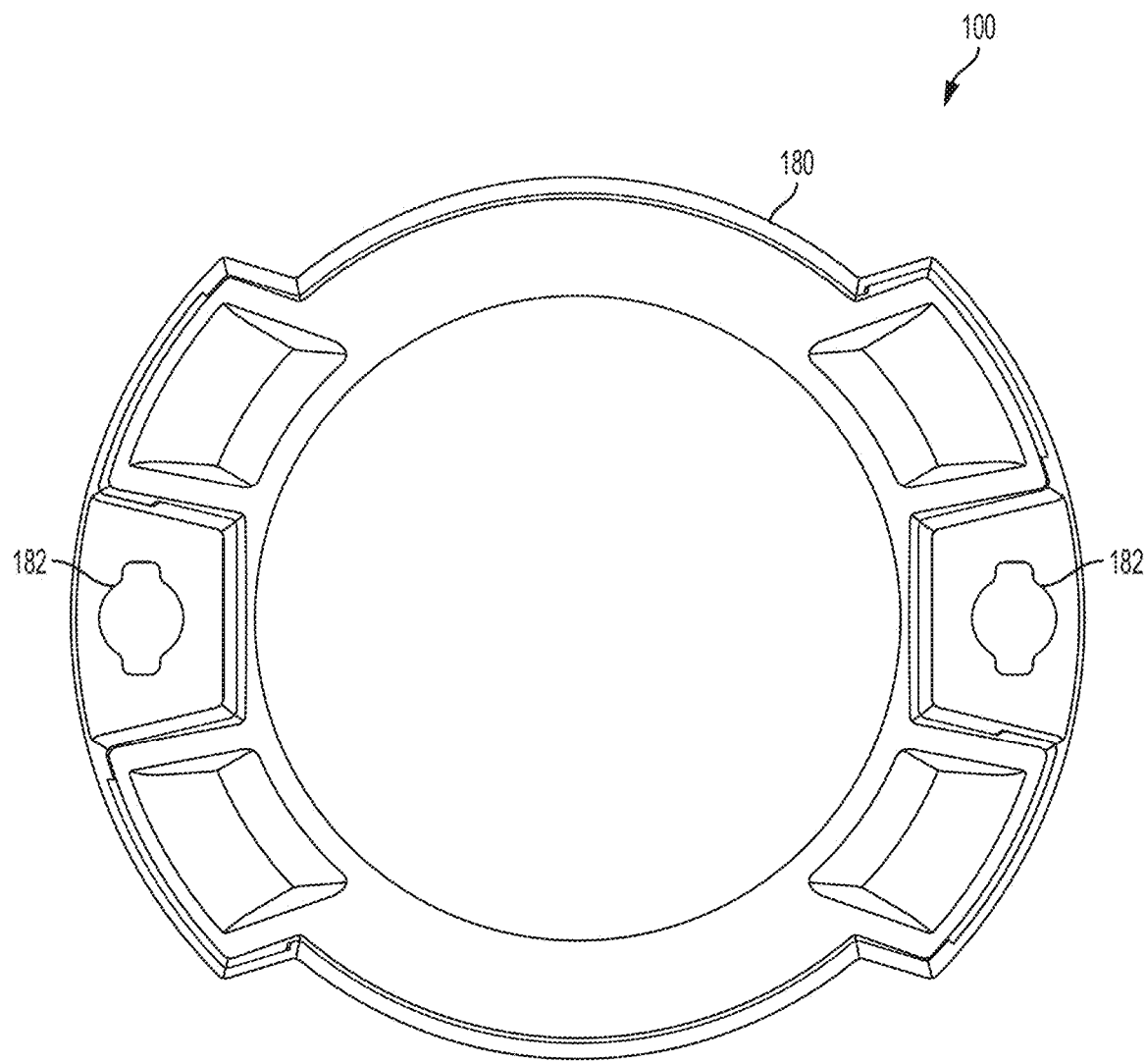
FIG. 1B illustrates a front view of a beacon transmitter according to embodiments of the invention.

FIG. 1B illustrates an embodiment of the beacon transmitter 100 including a housing 180 with mounting holes 182. The various components of the beacon transmitter 100 illustrated in FIG. 1A are located within and supported by the housing 180. The mounting holes 182 are configured to receive fasteners (e.g., screws) to secure the beacon transmitter 100 to an object to be tracked. Other securing elements are used in some embodiments, such as an adhesive pad on the back of the housing 180 (not shown). In some embodiments, the beacon transmitter 100 includes a housing having one or more of a different shape, differently positioned mounting holes, and different elements for mounting to objects.

Figure 2:
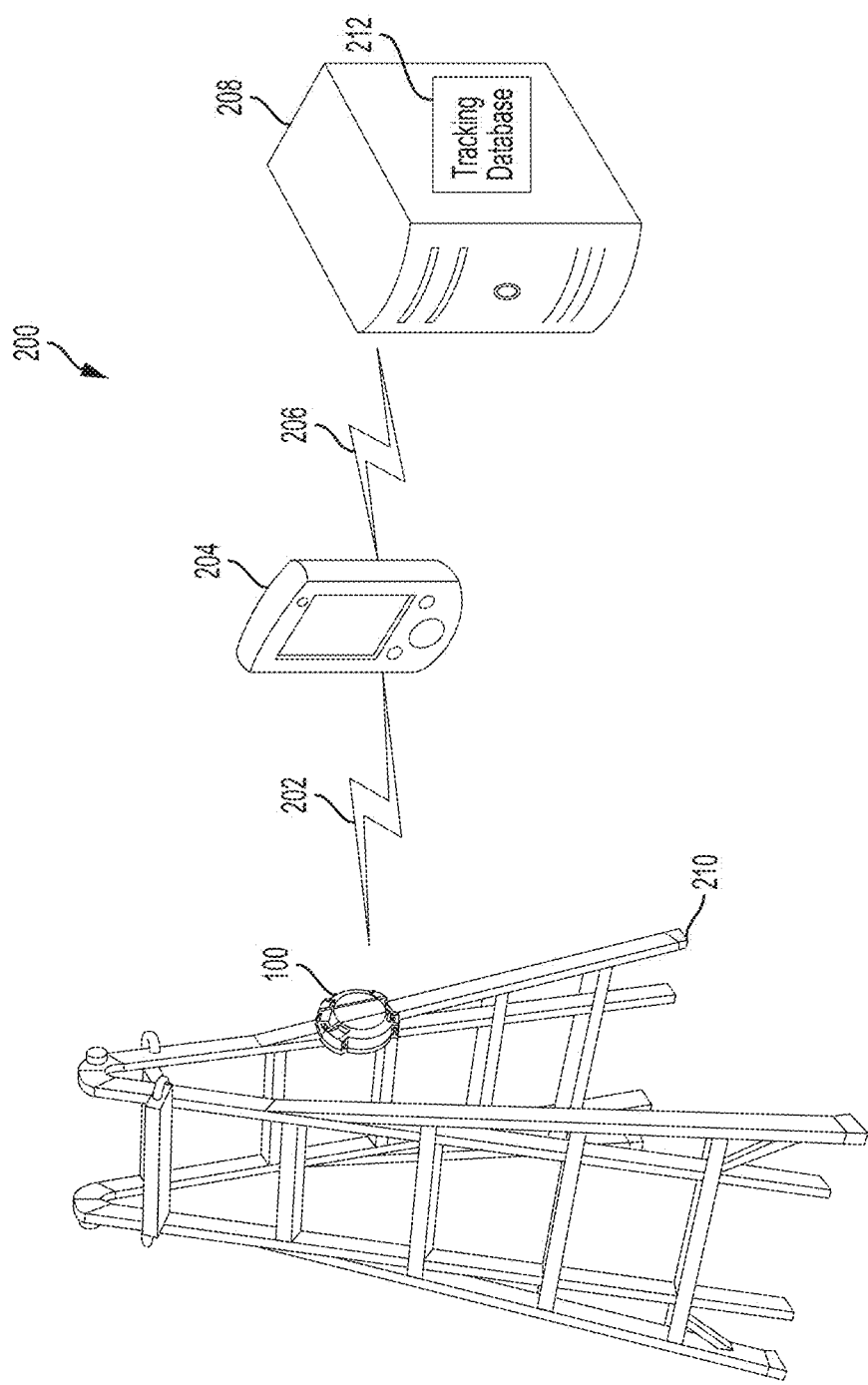
FIG. 2 depicts an object location tracking system including the beacon transmitter of FIGS. 1A-B attached to an object, according to embodiments of the invention.

FIG. 2 depicts an object location tracking system 200 including the beacon transmitter 100 attached to an object 210, illustrated as a ladder. In some embodiments, the beacon transmitter 100 is secured to the object 210 using an adhesive, hook and loop fasteners, or the like, rather than via fasteners through the mounting holes 182. The beacon transmitter 100 communicates via wireless signals 202 (e.g., Bluetooth™ low energy transmissions) with a personal wireless device 204 configured to receive such signals. The personal wireless device 204 (also referred to as a receiving device) may be, for example, a mobile smart phone, laptop computer, desktop computer, personal digital assistant (PDA), or other receiving device. Personal wireless device 204 communicates via a network 206 with a location server 208. Example computer systems that may implement personal wireless device and location server 208 are discussed below with respect to FIG. 10. The network 206 may include one more of a local area network (LAN), wide area network (WAN) (e.g., the Internet), a cellular network, or other networks.

In some embodiments, the beacon transmitter 100 is integrated within an object to be tracked. For example, with respect to FIGS. 11A-B, the beacon transmitter 100 is integrated into a power tool 1100, which is described in further detail below.

As described in further detail below, the personal wireless device 204 receives beacon data from the beacon transmitter 100 via the wireless signals 202. The beacon data may include one or more of a transmitter identifier, a user identifier, user contact information, timestamp, state of charge of the battery 110, an object identifier (identifying the object 210), and other status information. In turn, the personal wireless device 204(a) logs the beacon data locally on a memory of the personal wireless device 204, (b) sends tracking data, based on the beacon data, to the location server 208 for logging, or (c) both logs the beacon data and sends the tracking data.

The location server 208 includes a tracking database 212. A tracking application may be executed by a processor of the location server 208 to receive tracking data from the personal wireless device 204, update the tracking database 212, and to receive and respond to database queries for the tracking database 212. The tracking database 212 stores tracking data for the beacon transmitter 100 including one or more of a transmitter identifier, a user identifier (e.g., an owner of the beacon transmitter 100), user contact information, timestamp, last known location, state of charge of the battery 110, other status information, personal wireless device identifier (e.g., identifying the most recent personal wireless device 204 that received communications from the beacon transmitter and communicated to the location server 208), and location history (e.g., including previous known locations, timestamps, and personal wireless device identifiers). The tracking database 212 also stores a lost/not-lost indication (e.g., a flag) that indicates, based on a value of the indicator, whether the beacon transmitter 100 is considered "lost" or "not lost."

Although a single beacon transmitter 100 is illustrated in FIG. 2, in some embodiments, the system 200 includes a plurality of beacon transmitters 100, each used to track a different object. Similarly, although a single personal wireless device 204 is illustrated in FIG. 2, in some embodiments, the system 200 includes a plurality of personal wireless devices 204 that may each receive wireless signals 202 from one or more of the personal wireless devices 204 and that may each communicate with the location server 208 over the network 206 or another network. Accordingly, the tracking database 212 stores and updates tracking data for each beacon transmitter 100 in the system 200 based on communications from the one or more personal wireless devices 204.

Although the location server 208 is illustrated as a singular unit, the location server 208 may be made up of various servers located together or remotely and coupled via one or more networks. Similarly, the tracking database 212 may be made up of various databases in communication with one another.

Although the object 210 is illustrated in FIG. 2 as being a ladder, the beacon transmitter 100 may be mounted on various other objects including other types of tools and accessories. For example, the beacon transmitter 100 may be mounted on and used with hand tools, power tools, test and measurement equipment, battery packs, vacuum cleaners, work site radios, outdoor power equipment, and vehicles. Other tools on which versions of the beacon transmitter 100 may be mounted include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. Other tools on which versions of the transmitter may be mounted include devices such as electronic key boxes, calculators, cellular phones, head phones, cameras, motion sensing alarms, flashlights, worklights, weather information display devices, a portable power source, a digital camera, a digital music player, a radio, and multi-purpose cutters.

Figure 3:
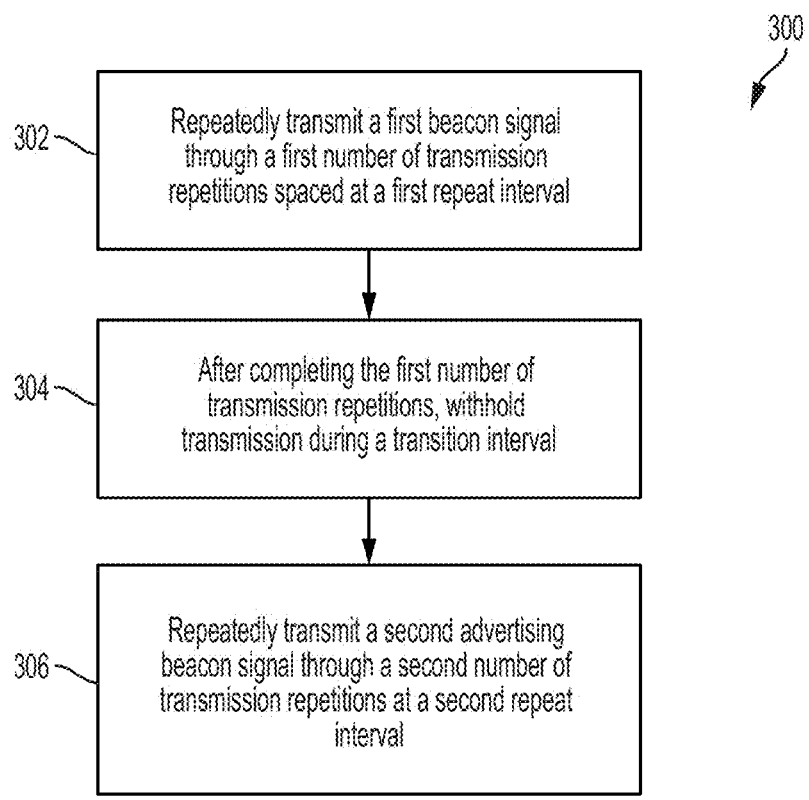
FIG. 3 is a flowchart for a method of communication by a beacon transmitter for location reporting according to embodiments of the invention.

FIG. 3 is a flowchart for a method 300 of communication by a beacon transmitter for location reporting according to embodiments of the invention. The method of FIG. 3 is described with respect to the system 200; however, the method may be similarly applicable to other devices and systems. In block 302, the beacon transmitter 100 repeatedly transmits a first beacon signal through a first number of transmission repetitions spaced at a first repeat interval. In some embodiments, the first beacon signal is a signal for alerting a receiving application (e.g., of the personal wireless device 204) to the presence of the beacon transmitter 100 that is transmitting the second advertising beacon signal. In some embodiments, the first beacon signal is a signal using a first open protocol, such as iBeacon™, rather than a proprietary protocol.

After completing the first number of transmission repetitions, the beacon transmitter 100 withholds further transmission (e.g., of the first beacon signal) during a transition interval (block 304). After the transition interval, the beacon transmitter 100 repeatedly transmits a second advertising beacon signal through a second number of transmission repetitions at a second repeat interval (block 306). In some embodiments, the second advertising beacon signal is a signal for providing identification of a device (e.g., the beacon transmitter 100) transmitting the second advertising beacon signal. In some embodiments, the second advertising beacon signal is a signal using a second proprietary protocol, rather than an open protocol, that is different than the protocol of the first beacon signal.

In some embodiments, the first repeat interval of block 302 is of a length different from a length of the second repeat interval of block 306. In some embodiments, the first repeat interval of block 302 is of a fixed length different from a fixed length of the second repeat interval of block 306. In some embodiments, the first repeat interval of block 302 is of a length that is less than a length of the second repeat interval of block 306, such as less than $1/50^{th}$ of a length of the second repeat interval of block 306. In some embodiments, the first repeat interval is set at 100 ms for purposes of standards compliance. In some embodiments, the second repeat interval is 7.8 seconds to compromise between transmitter battery life and user experience. In some embodiments, an overall cycle time of 40 seconds results from the selection of the two intervals. In some embodiments, the first repeat interval and the second repeat interval are selected to be the same. One of ordinary skill in the art will readily ascertain, in light of having read the present disclosure that the selection of particular repeat intervals and cycle times will vary between embodiments without departing from the scope and intent of the present disclosure.

In some embodiments, after completing the second number of transmission repetitions in block 306, the process returns to block 302 to perform the repeatedly transmitting the first beacon signal through the first number of transmission repetitions spaced at the first repeat interval. In some embodiments, a terminal interval elapses between the completing the second number of transmissions in block 306 and returning to block 302 perform the repeatedly transmitting the first beacon signal through the first number of transmission repetitions spaced at the first repeat interval.

Figure 4A:
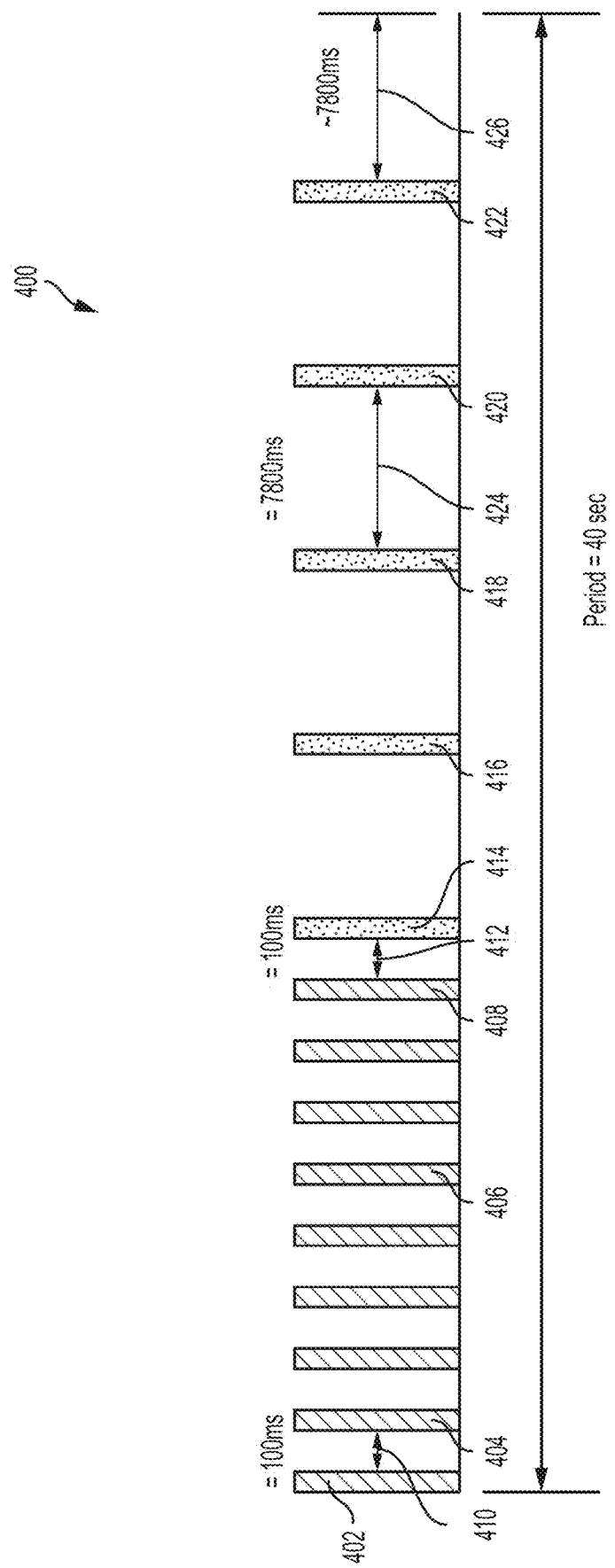
FIGS. 4A-B illustrate examples of timing diagrams for a series of transmissions by a beacon transmitter for location reporting according to embodiments of the invention.

FIG. 4A illustrates an example of a timing diagram for a series of transmissions 400 according to embodiments of the invention. The series of transmissions 400 may be, for example, transmissions resulting from execution of the flow chart illustrated in FIG. 3, and may be transmitted by the beacon transmitter 100. The series of transmissions 400 includes a first beacon signal 402-408 that is repeatedly transmitted through a first number (e.g., nine transmissions in the series of transmissions 400) of transmission repetitions spaced at a first repeat interval 410. For example, the first beacon signals 402-408 are transmitted during execution of block 302 of FIG. 3. In the series of transmissions 400, an example embodiment uses a first repeat interval 410 of 100 milliseconds (ms). While only a first repeat interval 410 between the first beacon signal 402 and first beacon signal 404 is labeled, some embodiments employ first repeat intervals of equal duration between each of first beacon signals 402-408 and the respective preceding first beacon signal, but that labeling of those first repeat intervals is omitted in FIG. 4A in the interest of clarity of illustration. Additionally, while a first repeat interval 410 of 100 ms is illustrated in FIG. 4A, other repeat interval lengths for the first repeat interval 410 are used in some embodiments.

After completing the first number of transmission repetitions, transmission is withheld during a transition interval 412 (see, e.g., block 304 of FIG. 3). In the series of transmissions 400, an example embodiment uses a transition interval 412 of 100 ms, although other durations are used in some embodiments. Additionally, while the transition interval 412 is of a duration equal to the first repeat interval 410, in some embodiments, durations of the transition interval 412 will vary from durations of the first repeat interval 410. Further, while nine repetitions of first beacon signal 402-408 are shown FIG. 4A, other numbers of transmission repetitions of the first beacon signal 402-408 are used in some embodiments.

A second advertising beacon signal 414-422 is repeatedly transmitted through a second number of transmission repetitions at a second repeat interval 424. For example, the second advertising beacon signal 414-422 are transmitted during execution of block 306 of FIG. 3. In the series of transmissions 400, an example embodiment uses a second repeat interval 424 of 7800 ms. In the series of transmissions 400, an example embodiment resumes transmission of the first beacon signal 402 after a terminal repeat interval 426 of 7800 ms. While five repetitions of the second advertising beacon signal 414-422 are shown FIG. 4A, other numbers of transmission repetitions of the second advertising beacon signal 414-422 are used in some embodiments. Further, while terminal repeat interval 426 is of a duration equal to the second repeat interval 424, other interval durations for the terminal repeat interval 426 are used in some embodiments, and, in some embodiments, durations of the terminal repeat interval 426 will vary from durations of the second repeat interval 424. Additionally, while the second repeat interval 424 is illustrated in FIG. 4A as 7800 ms, other repeat interval lengths for the second repeat interval 424 are used in some embodiments.

The second advertising beacon signal 414-422 includes the beacon data noted above, including one or more of a transmitter identifier, a user identifier, user contact information, timestamp, state of charge of the battery 110, and other status information.

In some embodiments, the series of transmissions 400 including the first beacon signals 402-408 and the second advertising beacon signals 414-422 are transmitted using a 2.4 GHz Bluetooth™ low energy (BLE) signal. While a BLE signal is described as an example of a suitable radio beacon signal, one of ordinary skill in the art will readily ascertain from having read the present disclosure that other beacon signal types will be used in various embodiments without departing from the scope and intention of the present disclosure.

Accordingly, in some embodiments, the series of transmissions 400 includes a beaconing transmission pattern that uses two different beacon signals (the first beacon signal 402-408 and the second advertising beacon signal 414-422) repeated in a pattern in which the first beacon signal 402-408 is repeatedly transmitted using a first repeat interval 410 and the second advertising beacon signal 414-422 is repeatedly transmitted using a second repeat interval 424 that is longer than the first repeat interval 410. By using a longer interval, the rate of transmission is decreased during the period of time that the second advertising beacon signal 414-422 is transmitted relative to the period of time that the first beacon signal 402-408 is transmitted. Reducing the rate of transmission in this period reduces power consumption of the beacon transmitter 100 over the series of transmission 400 and extends the life of the battery 110.

Figure 4B:
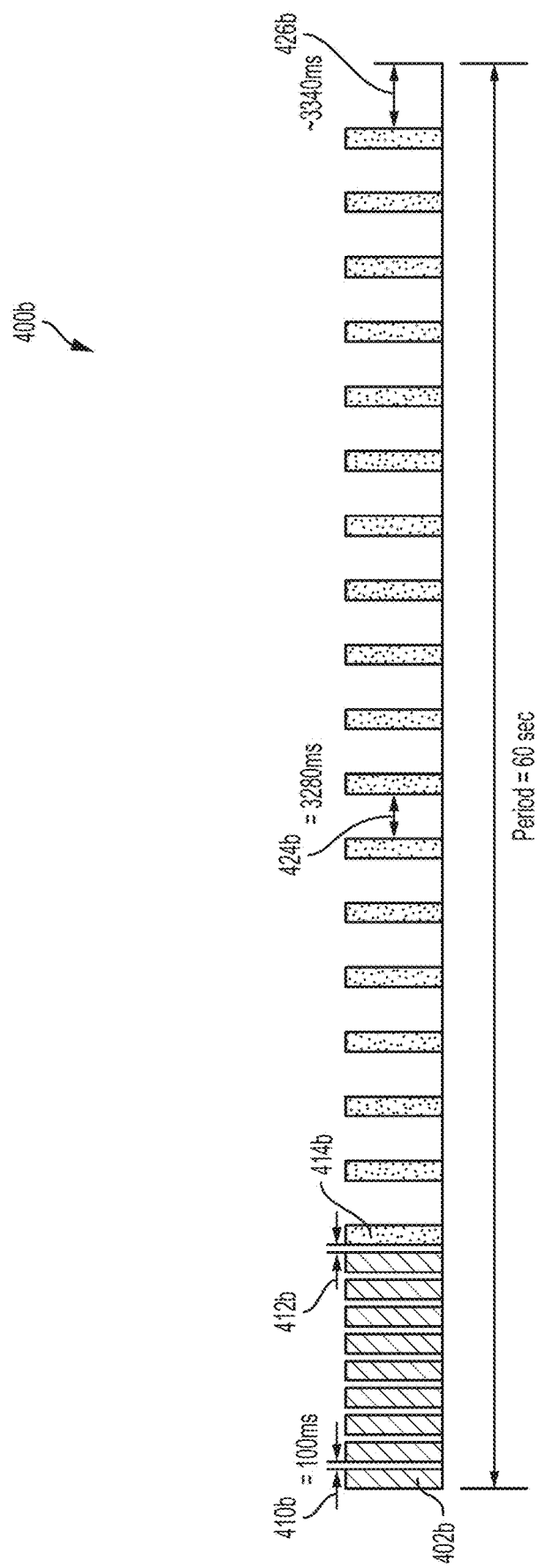

FIG. 4B illustrates another example of a timing diagram for a series of transmissions 400b according to embodiments of the invention. In some embodiments, the series of transmissions 400b are used in place of the series of transmissions 400 of FIG. 4A. The series of transmissions 400b may be, for example, transmissions resulting from execution of the flow chart illustrated in FIG. 3, and may be transmitted by the beacon transmitter 100. The series of transmissions 400b is similar to the series of transmissions 400, and, accordingly, the previous discussion of the series of transmissions 400, including alternative embodiments, similarly applies to the series of transmissions 400b, but for the differences described below. Accordingly, like elements between FIGS. 4A and 4B are given like reference numerals with the addition of a "b" for those shown in FIG. 4B, and the particular discussion of the similar elements is not repeated.

The series of transmissions 400b in FIG. 4B is similar to the series of transmissions 400 in FIG. 4A except for the number of transmission repetitions of the second advertising beacon signal 414b, the duration of the second repeat interval 424b, and the duration of the terminal repeat interval 426b. More particularly, in FIG. 4B, the first beacon signal 402b is transmitted nine times in repetition with the first repeat interval 410b between each transmission being 100 milliseconds. Transmission is then withheld during the transmission interval 412b for 100 milliseconds. The second advertising beacon signal 414b is then transmitted eighteen times in repetition with the second repeat interval 424b between each transmission being 3280 milliseconds. Then, transmission is withheld during the terminal repeat interval 426b for 3340 milliseconds, before returning to the beginning of the series of transmissions 400b to resume transmission of the first beacon signal 402b. The total duration of the series of transmissions 400b (as illustrated in FIG. 4B) is 60 seconds, which is seconds longer than the total duration of the series of transmissions 400 (as illustrated in FIG. 4A).

To simplify the diagram of FIG. 4B, only the first instance of the first beacon signal 402b (rather than all nine) and the first instance of the second advertising beacon signal 414b (rather than all eighteen) are labeled. Additionally, similar to the series of transmissions 400, in the series of transmissions 400b, the number of transmission repetitions of one or both of the first beacon signal 402b and the second advertising beacon signal 414b is varied in some embodiments, as is the duration of one or more of the first repeat interval 410b, the transmission interval 412b, the second repeat interval 424b, and the terminal repeat interface 426b.

Figure 5:
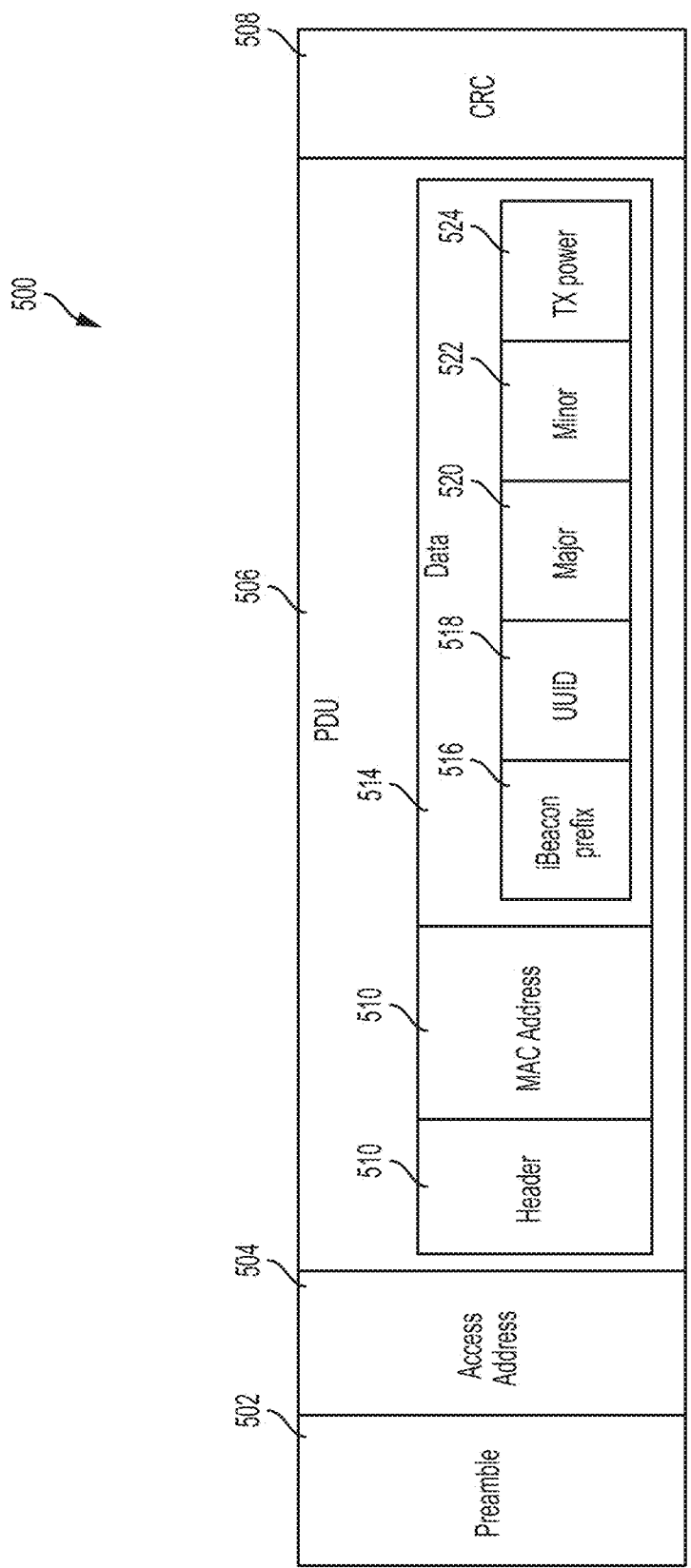
FIG. 5 depicts a first beacon diagram for a first beacon signal transmittable by a beacon transmitter for location reporting according to embodiments of the invention.

FIG. 5 depicts a first beacon diagram 500, which represents exemplary contents of the first beacon signals 402-408 transmitted by the beacon transmitter 100 according to embodiments of the invention. The example first beacon diagram 500 illustrates the iBeacon™ protocol and includes a 47-byte transmission includes a 1-byte preamble 502, a 4-byte access address, which is generally set to the value 0x8E89BED6, a protocol data unit (PDU) 506 of 2-39 bytes, and a cyclic redundancy check of 3 bytes.

PDU 506 includes a header 510 of 2 bytes, a MAC address 512 of 6 bytes, and data 514 of 0-31 bytes. Data 514 includes an iBeacon™ prefix 516 of 9 bytes, a universally unique identifier (UUID) 518 of 16 bytes, a major component 520 of 2 bytes, a minor component 522 of 2 bytes, and a transmission power component 524 of 1 bytes. The UUID 518 may identify, uniquely, the device transmitting the signal (e.g., the beacon transmitter 100). In some embodiments, the first beacon signals 402-408 may take the form of another open protocol different than that which is illustrated in FIG. 5. For example, the particular fields and the lengths of the fields (e.g., the number of bytes) in the first beacon signals 402-408 illustrated in FIG. 5 is exemplary, and some embodiments include additional fields, fewer fields, alternate fields, or fields with different lengths.

Figure 6:
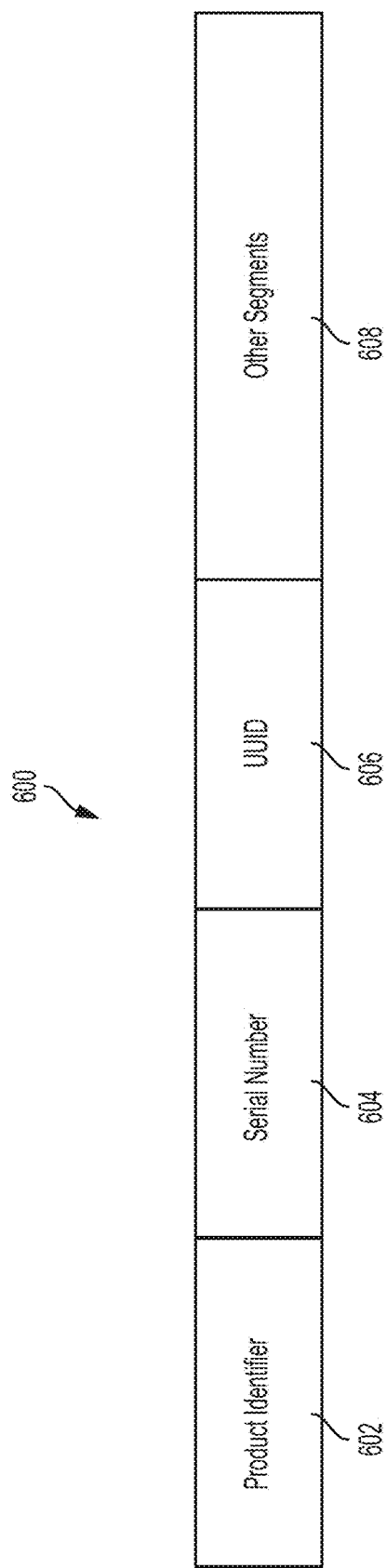
FIG. 6 depicts a second beacon diagram for a second beacon signal transmittable by a beacon transmitter for location reporting according to embodiments of the invention.

FIG. 6 depicts a second beacon diagram 600, which represents exemplary contents of the second advertising beacon signals 414-422 transmitted by the beacon transmitter 100 according to embodiments of the invention. The second beacon diagram 600 has various segments including a uniquely identifying product identifier (ID) 602 that uniquely identifies the type of device transmitting the signal (e.g., the model of the beacon transmitter 100), a serial number 604 that uniquely identifies the particular device from other devices of a similar type, and a universally unique identifier (UUID) 606 that uniquely identifies the particular device transmitting the signal (e.g., the beacon transmitter 100). The second beacon diagram 600 also includes other segments 608 as well, which may include data representing one or more of a user identifier, user contact information, timestamp, state of charge of the battery 110, and other status information. In some embodiments, the second advertising beacon signals 414-422 may take the form of another proprietary protocol different than that which is illustrated in FIG. 6. For example, the particular fields and the lengths of the fields (e.g., the number of bytes)

in the second advertising beacon signals 414-422 illustrated in FIG. 6 is exemplary, and some embodiments include additional fields, fewer fields, alternate fields, or fields with different lengths.

Figure 7A:
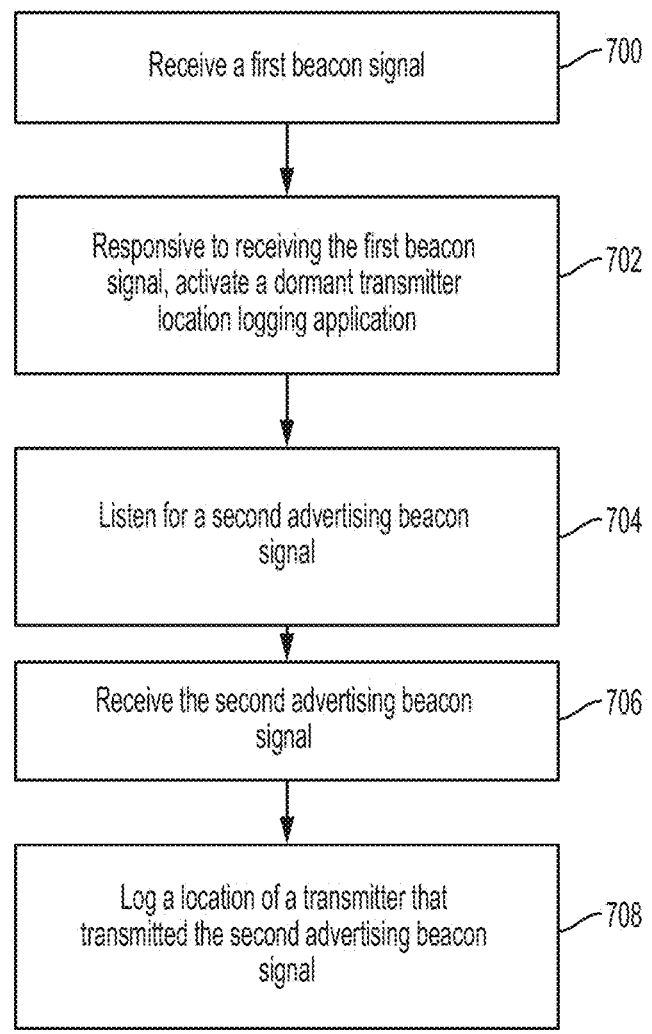
FIG. 7A is a flowchart for a method for implementing location reporting for a receiving device in communication with a beacon transmitter according to embodiments of the invention.

FIG. 7A is a flowchart for a method for implementing location reporting for a receiving device in communication with a beacon transmitter according to embodiments of the invention. The method of FIG. 7A is described with respect to the system 200; however, the method may be similarly applicable to other devices and systems. In block 700, the personal wireless device 204 receives a first beacon signal, such as one of the first beacon signals 402-410. Responsive to receiving the first beacon signal, a dormant transmitter location logging application executing on the personal wireless device 204 is activated (block 702). In some embodiments, an operating system of the personal wireless device 204 receives the first beacon signal and activates the dormant transmitter location logging application. In some embodiments, the first beacon signal is a signal using a first open protocol for alerting the receiving application to the presence of the beacon transmitter 100 transmitting the second advertising beacon signal.

The transmitter location logging application of the personal wireless device 204 listens for a second advertising beacon signal (block 704). For example, to listen, the personal wireless device 204 may execute a software loop that repeatedly checks for a second advertising beacon signal being received by a wireless antenna of the personal wireless device 204. In block 706, the personal wireless device 204 receives the second advertising beacon signal, such as one of the second beacon signals 416-422, from the transmitting device.

In block 708, a location of the beacon transmitter 100 that transmitted the second advertising beacon signal is logged by the transmitter location logging application of the personal wireless device 204. For example, upon receipt of one of the second advertising beacon signals 414-422 including the beacon data, the personal wireless device 204 determines the transmitter identifier of the beacon transmitter 100 based on beacon data, and determines the location of the personal wireless device 204 based on an output from a global navigation satellite system (GNSS) receiver of the personal wireless device 204. As one of skill in the art will readily ascertain from having read the present disclosure, while GNSS is described as an example of location detection, embodiments will include other forms of location awareness, such as registration of location (e.g. stored in a memory as part of an initial set-up) or location detection through detection of wireless networks, without departing from the scope and intent of the present disclosure. The personal wireless device 204 logs (e.g., stores in a memory) the determined location with the transmitter identifier of the beacon transmitter 100 such that the location of the personal wireless device 204 is logged as the location of the beacon transmitter 100.

In some embodiments, the additional information may be logged by the personal wireless device 204 for the beacon transmitter 100 in block 708. For example, additional information from the beacon data including one or more of a user identifier, user contact information, timestamp, state of charge of the battery 110, and other status information may be logged for the beacon transmitter 100 in block 708. Furthermore, additional information from the personal wireless device 204 may be logged for the beacon transmitter 100 in block 708, such as a timestamp (e.g., when not provided as part of the beacon data) and receiving device identifier that identifies the personal wireless device 204 or the user thereof. The data that is logged by the personal wireless device 204 in block 708 may be referred to as logged data for the beacon transmitter 100.

In some embodiments, the personal wireless device 204 further sends the logged data, including the transmitter identifier and location of the beacon transmitter 100 to the location server 208 for storage and processing. In some embodiments, the receiving device sends the logged data to the location server 208 each time block 708 is executed. In other embodiments, the receiving device may be configured to delay sending the logged data when the receiving device has already sent similar data recently (e.g., within the past minute, ten minutes, or hour) to limit data transmissions and conserve power. In some embodiments, delaying transmission of the logged data enables the receiving device to obtain further logged data for other beacon transmitters using a similar process and to bundle the logged data for multiple beacon transmitters for a single transmission.

In some embodiments, the method of FIG. 7A further includes, during execution of steps 700-706, the personal wireless device 204 waiting through a first number of transmission repetitions of the beacon transmitter 100 spaced at a first repeat interval, after the first number of transmission repetitions, waiting during a transition interval, and, thereafter, receiving the second advertising beacon signal through a second number of transmission repetitions of the beacon transmitter 100 spaced at a second repeat interval.

In some embodiments, the method of FIG. 7A occurs in the background of the personal wireless device 204 such that the receiving and logging of information related to the beacon transmitter 100 occurs without particular notifications to a user of the personal wireless device 204 of the particular receiving and logging. For example, although the transmitter location logging application may be activated from a dormant state, the activation may occur in the background such that an application on the personal wireless device 204 currently displaying information on the personal wireless device 204 is not interrupted or altered to provide a notification of the activation. Similarly, the logged data may be logged on the personal wireless device 204 and sent to the location server 208 for logging without a particular notification of these actions being provided to the user of the personal wireless device 204.

In some embodiments, in addition to being able to be activated upon receipt of the first beacon signal (e.g., as described with respect to blocks 700 and 702), the transmitter location logging application of the personal wireless device 204 may also be activated in response to receiving a user activation input through a user interface. For example, the user activation input may include a user input indicating a selection of the transmitter location logging application for execution. In response to the user activation input, the receiving device proceeds to block 704-708 as previously described.

Figure 7B:
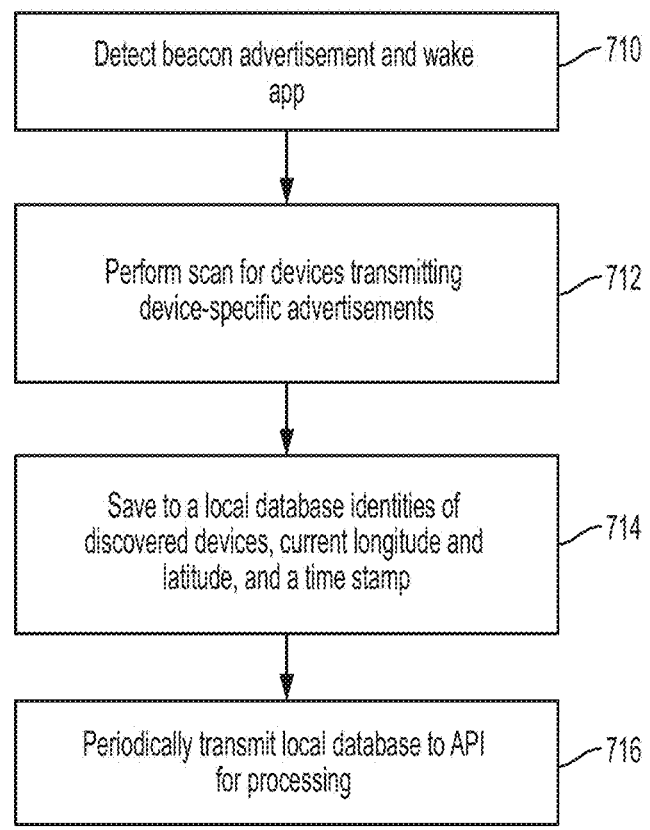
FIG. 7B is a flowchart for a method for implementing location reporting for a receiving device in communication with a beacon transmitter according to embodiments of the invention.

FIG. 7B is a flowchart for a method for implementing location reporting for a receiving device in communication with a beacon transmitter according to embodiments of the invention. The method of FIG. 7B is described with respect to the system 200; however, the method may be similarly applicable to other devices and systems. In block 710, the personal wireless device 204 detects a beacon advertisement, such as one of the first beacon signals 402-410. Responsive to detecting the beacon advertisement, personal wireless device 204 wakes a dormant app for transmitter location logging. In some embodiments, an operating system of the personal wireless device 204 receives the beacon advertisement and wakes the dormant transmitter location logging application. In some embodiments, the beacon advertisement is a signal using a first open protocol for alerting the receiving application to the presence of the beacon transmitter 100 transmitting the second advertising beacon signal. In some embodiments, the detected beacon advertisement is a generic beacon advertisement that is not filtered based on, for example, the device type or device manufacturer that transmitted the beacon advertisement. In other embodiments, a beacon advertisement is considered detected in step 710 after the personal wireless device 204 determines that the beacon advertisement is a specific beacon advertisement including information indicating that the beacon advertisement was transmitted from a device of a particular type or manufacturer.

The personal wireless device 204 then performs a scan (e.g., a Bluetooth™ scan) for devices transmitting device-specific advertisements (block 712). For example, to scan, the personal wireless device 204 may execute a software loop that repeatedly checks for a device-specific advertising beacon signal being received by a wireless antenna of the personal wireless device 204. In block 714, the personal wireless device 204 discovers the device associated with each received device-specific advertising beacon signal and, in response, saves to a local database the identity of each discovered device, a current longitude and latitude, and a time stamp.

For example, upon receipt of one of the device-specific advertisements, such as second advertising beacon signals 414-422, including the beacon data, the personal wireless device 204 determines the transmitter identifier of the beacon transmitter 100 based on the beacon data, and determines the location of the personal wireless device 204 based on an output from a global navigation satellite system (GNSS) receiver of the personal wireless device 204. The personal wireless device 204 logs (e.g., stores in a memory) the determined location with the transmitter identifier of the beacon transmitter 100 such that the location of the personal wireless device 204 is logged as the location of the beacon transmitter 100.

In some embodiments, the personal wireless device 204 further sends the logged data, including the transmitter identifier and location of the beacon transmitter 100 to the location server 208 for storage and processing by periodically transmitting the data in the local database to an API for processing (block 716). In some embodiments, the receiving device sends the logged data to the location server 208 each time block 714 is executed. In other embodiments, the receiving device may be configured to delay sending the logged data when the receiving device has already sent similar data recently (e.g., within the past minute, ten minutes, or hour) to limit data transmissions and conserve power. In some embodiments, delaying transmission of the logged data enables the receiving device to obtain further logged data for other beacon transmitters using a similar process and to bundle the logged data for multiple beacon transmitters for a single transmission.

In some embodiments, the method of FIG. 7B further includes, during execution of steps 710-716, the personal wireless device 204 waiting through a first number of transmission repetitions of the beacon transmitter 100 spaced at a first repeat interval, after the first number of transmission repetitions, waiting during a transition interval, and, thereafter, receiving the second advertising beacon signal through a second number of transmission repetitions of the beacon transmitter 100 spaced at a second repeat interval.

In some embodiments, the method of FIG. 7B occurs in the background of the personal wireless device 204 such that the receiving and logging of information related to the beacon transmitter 100 occurs without particular notifications to a user of the personal wireless device 204 of the particular receiving and logging. For example, although the transmitter location logging application may be activated from a dormant state, the activation may occur in the background such that an application on the personal wireless device 204 currently displaying information on the personal wireless device 204 is not interrupted or altered to provide a notification of the activation. Similarly, the logged data may be logged on the personal wireless device 204 and sent to the location server 208 for logging without a particular notification of these actions being provided to the user of the personal wireless device 204.

In some embodiments, in addition to being able to be activated upon receipt of the generic advertisement beacon (e.g., as described with respect to blocks 710), the transmitter location logging application of the personal wireless device 204 may also be activated in response to receiving a user activation input through a user interface. For example, the user activation input may include a user input indicating a selection of the transmitter location logging application for execution. In response to the user activation input, the receiving device proceeds to block 712-716 as previously described.

Figure 8:
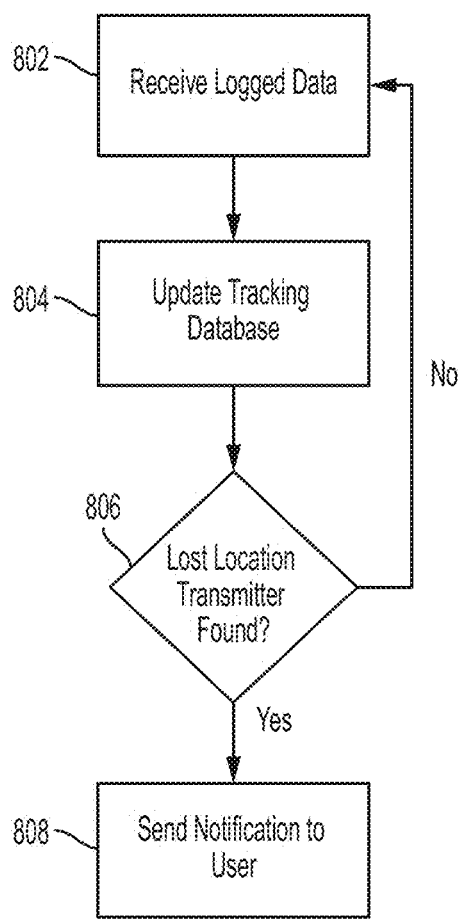
FIG. 8 is a flowchart for a method for processing location tracking data by a location server according to embodiments of the invention.

FIG. 8 is a flowchart for a method for processing location tracking data by the location server 208. The previously noted tracking application executed by a processor of the location server 208 may, in some embodiments, be used to implement the method of FIG. 8. In block 802, the location server 208 receives the logged data sent by the personal wireless device 204 (e.g., transmitted via the network 206). For example, as described above with respect to FIG. 7, the personal wireless device 204 may send logged data (e.g., logged in block 708) associated with the beacon transmitter 100 to the location server 208. In block 804, the location server 208 updates tracking data of the tracking database 212 with the logged data. For example, the location tracking application executing on the location server 208 determines the identity of the beacon transmitter 100 using the transmitter identifier within the logged data, and, further based on the logged data, updates the tracking data in the tracking database 212 associated with the determined beacon transmitter 100 including one or more of the user identifier, user contact information, timestamp, last known location, state of charge of the battery 110, other status information, personal wireless device identifier, and location history.

In block 806, the location server 208 determines whether the beacon transmitter 100 is currently designated as "lost." For example, the location tracking application executing on the location server 208 uses the transmitter identifier from the logged data to query the tracking database 212 to determine whether the lost/not-lost indicator indicates that the beacon transmitter 100 is lost or not lost. When the beacon transmitter 100 is currently designated as "not lost," the location server 208 returns to block 802. When the beacon transmitter is currently designated as "lost," the location server 208 proceeds to block 808 and sends a notification to a user associated with the beacon transmitter 100. As noted, user contact information for each beacon transmitter 100 may be stored in the tracking database 212 that identifies a user associated with the beacon transmitter 100 who is be notified. Accordingly, in block 808, the location tracking application executing on the location server 208 may access the user contact information for the beacon transmitter 100 and generate a notification (e.g., an email, text message, or other data message) to the user in accordance with the contact information.

Although FIG. 8 is described with respect to the system 200 and executed by the location server 208, the method illustrated may be applicable to other systems and executed by other devices in some embodiments.

Figure 9:
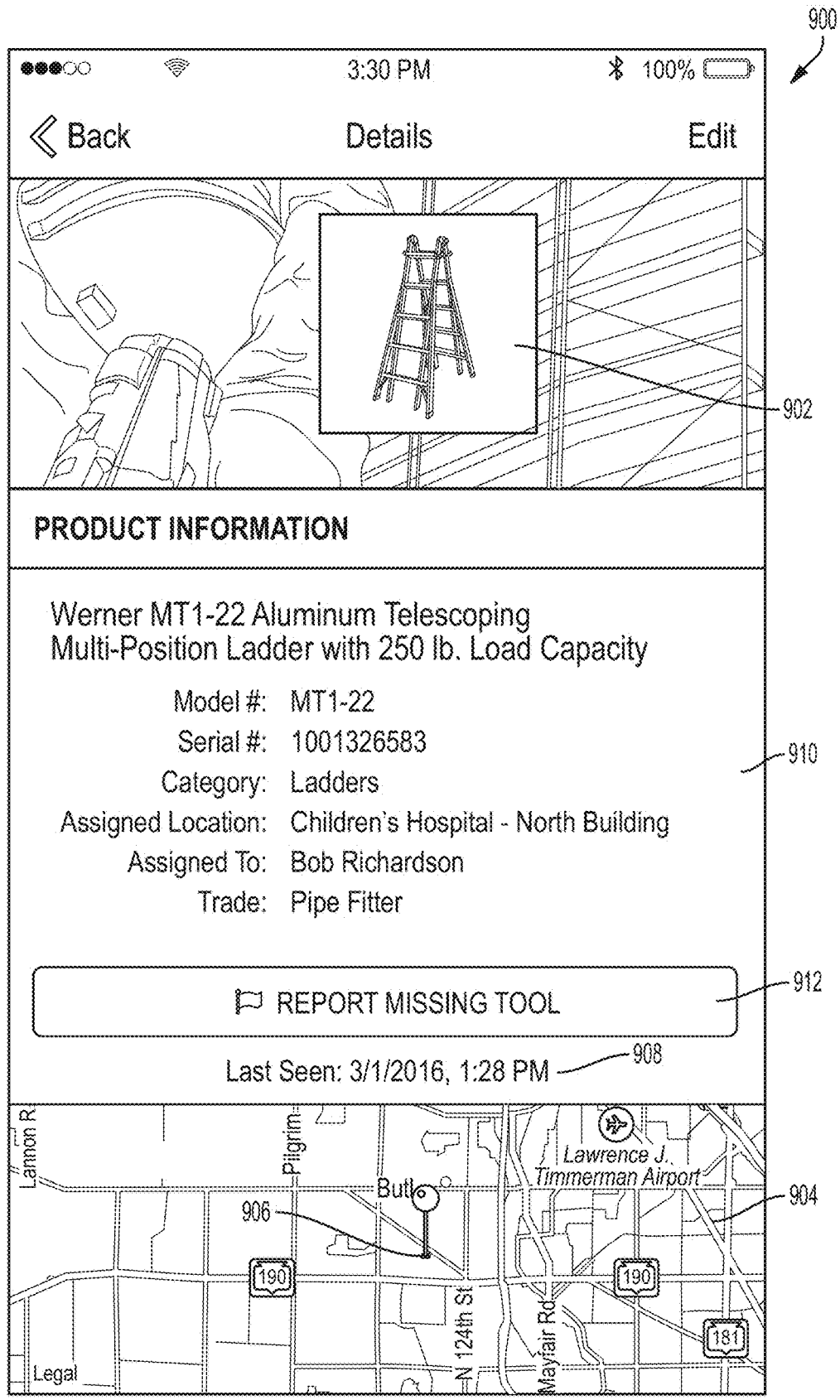
FIG. 9 depicts a user interface for a device implementing location reporting for a receiving device in communication with a beacon transmitter for location reporting according to embodiments of the invention.

FIG. 9 depicts a user interface for a device implementing location reporting for a receiving device in communication with a beacon transmitter for location reporting according to embodiments of the invention. The personal wireless device 204 generates and displays a user interface 900, for example, in response to a user selection of the beacon transmitter 100 on an inventory interface displayed on the personal wireless device 204. The user interface 900 includes an image 902, which may be of the beacon transmitter 100, the object 210 on which the beacon transmitter 100 is mounted, or the device into which the beacon transmitter 100 is integrated. The image 902 may be stored on the personal wireless device 204 or the tracking database 212 and is associated with the beacon transmitter 100 via, for example, the transmitter identifier of the beacon transmitter 100. A map 904, showing a logged location 906 of the beacon transmitter 100 is displayed. The logged location 906 may be the last known location of the beacon transmitter 100 obtained from a memory of the personal wireless device 204 or the tracking database 212. A timestamp 908 associated with the logged location 906 is also illustrated on the user interface 900. The user interface 900 further displays information 910 about the beacon transmitter 100 (e.g., obtained from the tracking database 212 or a memory of the personal wireless device 204).

A missing device control 912 for reporting the beacon transmitter 100 missing is also displayed. The personal wireless device 204 is operable to receive, via the missing device control 912, user input that indicates that the beacon transmitter 100 (identified by the information 910) is lost. The personal wireless device 204, in response, communicates lost device information to the tracking database 212 including one or more of a transmitter identifier of the beacon transmitter 100, an indication that the beacon transmitter 100 is lost, a timestamp, a user identifier, user contact information, and personal wireless device identifier. In response to receiving the lost device information, the location server 208 updates the tracking database 212 to indicate that the beacon transmitter 100 is lost (e.g., sets the lost/not-lost indicator to "lost"), and may update the beacon transmitter 100 data in the tracking database 212 with other of the lost device information as well. For example, the user contact information associated with the beacon transmitter 100 on the tracking database 212 may be updated to contact information for the personal wireless device 204 that is reporting the beacon transmitter 100 lost.

As can be appreciated based on the previous description of the system 200 and related methods, after the beacon transmitter 100 is reported lost, a second personal wireless device (similar to the personal wireless device 204) may later receive beacon data for the beacon transmitter 100 (e.g., in accordance with the method of FIG. 7) and the resulting logged data is sent to the location server 208. The location server 208 may then determine that the beacon transmitter 100 has been reported lost and provide a notification to the user in accordance with the method of FIG. 8. Accordingly, embodiments of the invention may implement community tracking and finding of objects (each associated with one of the beacon transmitters 100) using a plurality of personal wireless devices 204 and the location server 208.

Figure 10:
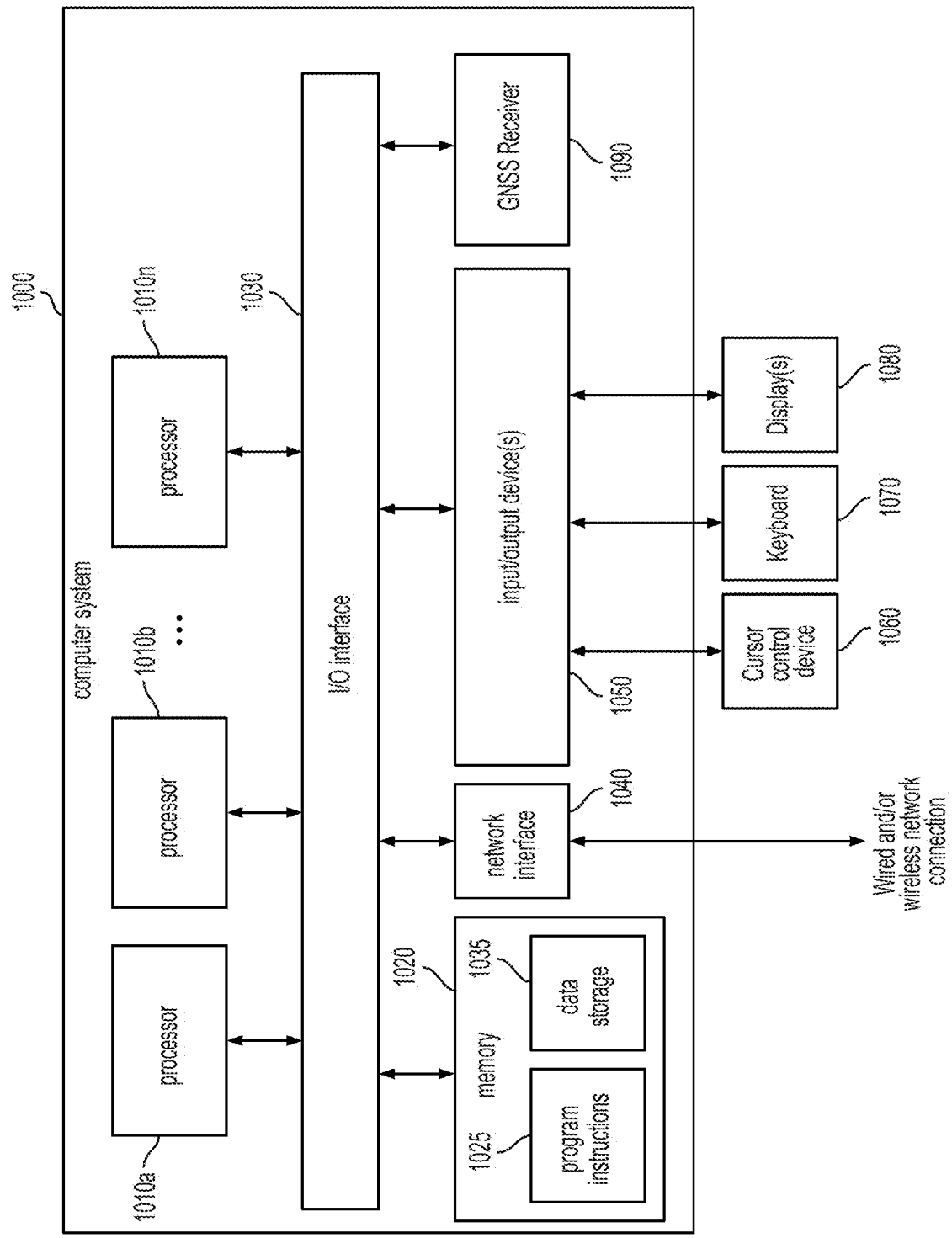
FIG. 10 illustrates an exemplary computer system for implementing location reporting according to embodiments of the invention.

Embodiments of location logging module and/or of the various location logging methods and techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, mobile telephone, workstation, network computer, a camera, a set top box, a mobile device, a consumer device, video game console, handheld video game device, application server, storage device, a peripheral device such as a switch, modem, router, or another type of computing or electronic device. The computer system 1000 is an example of a computer system that may be configured to implement the location server 208 (FIG. 2), and of a computer system that may be configured to implement the personal wireless device 204 (FIG. 2).

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

For example, when the computer system 1000 implements the personal wireless device 204, the network interface 1040 may include one or more wireless antennas to enable wireless communication with the beacon transmitter 100 and the location server 208. Additionally, when the computer system 1000 implements the location server 208, the network interface 1040 may include one or more wireless antennas to enable wireless communication with the personal wireless device 204.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, the computer system 1000 may further include a global navigation satellite system (GNSS) receiver 1090. The GNSS receiver 1090 is configured to receive signals from global navigation satellites and to determine, based on the received signals, a location of the GNSS receiver 1090 (e.g., including a latitude, longitude, and altitude) and time. The GNSS receiver 1090 is further configured to provide the determined location and time to other components of the computer system 1000, such as the processor(s) 1010. When the computer system 1000 implements the personal wireless device 204, the determined location and time information may be used as the location and time of the personal wireless device 204 used in the various embodiments described herein. The GNSS receiver may, in some embodiments, be a global positions system (GPS) receiver.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Figure 11A:
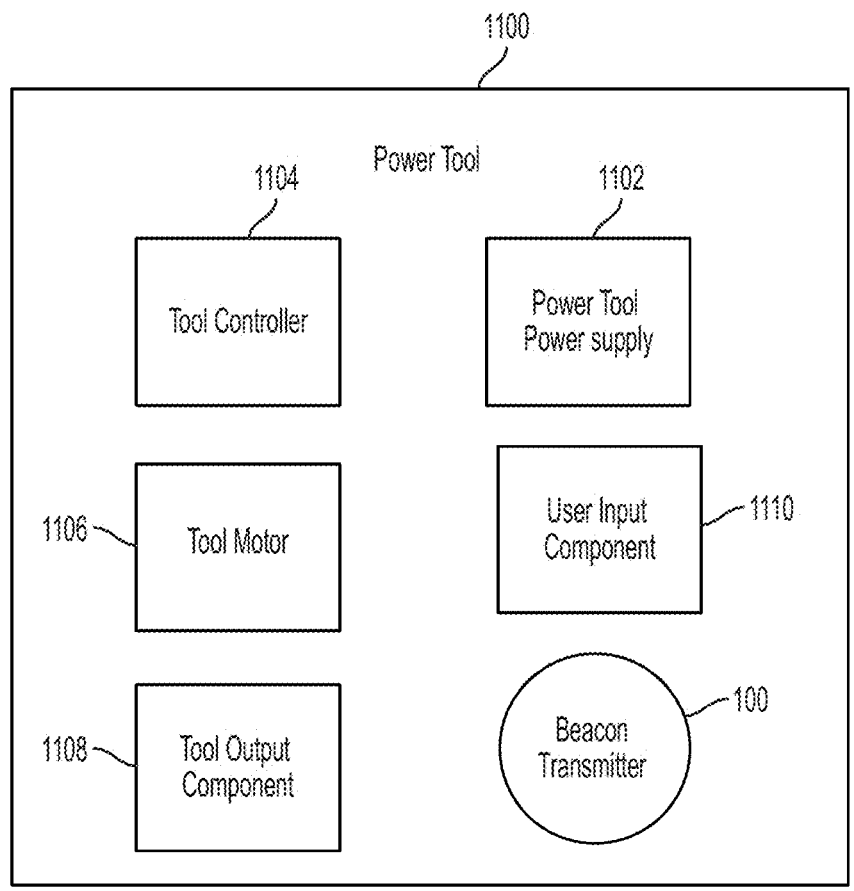
FIG. 11A-B illustrates an exemplary power tool incorporating the beacon transmitter of FIG. 1A for location reporting according to embodiments of the invention.
Figure 11B:
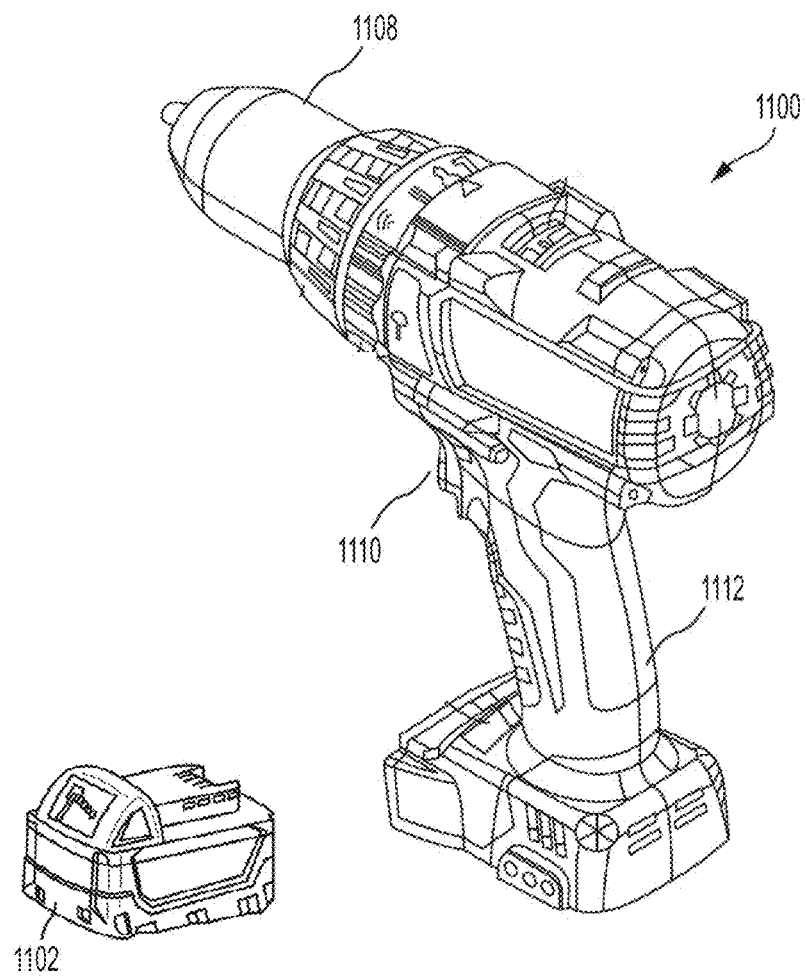

FIGS. 11A-B illustrate a power tool 1100 incorporating the beacon transmitter 100 described above. The power tool 1100 includes a power tool battery pack or other power tool power supply 1102, a tool controller 1104, a tool motor 1106, and a tool output component 1108. The power tool power supply 1102 may include a circuit for connection to alternating current power, may include power generation components, such as a wind or solar generator, or may be a battery pack that may include one or more battery cells (e.g., lithium-ion cells) within a housing includes contacts and an attachment mechanism for selectively securing and removing the power tool battery pack to the power tool 1100. The tool controller 1104 is coupled to and powered by the power tool power supply 1102, and controls the tool motor 1106 to drive the tool output component 1108. The tool output component 1108 may be, for example, a drill chuck, as illustrated in FIG. 11B. The tool controller 1104 may control the tool motor 1106 based on user input received via user input component 1110, which may be, for example, a trigger, as illustrated in FIG. 11B. The power tool 1100 may further include a tool housing 1112 (FIG. 11B) that house the tool controller 1104, the tool motor 1106, and the beacon transmitter 100.

The beacon transmitter 100 may be coupled to the tool controller 1104 and the power tool power supply 1102. For example, the beacon transmitter 100 may be powered by the power tool power supply 1102 when present, and by the battery 110 of the beacon transmitter 100 when the power tool power supply 1102 is not coupled to the power tool 1100. Additionally, the beacon transmitter 100 may communicate with the tool controller 1104 to, for example, (i) obtain tool usage data stored on a memory of the tool controller 1104 (e.g., obtained by sensors of the power tool 1100) to send to the personal wireless device 204 and/or (ii) provide tool configuration data (e.g., that is sent to the tool controller 1104 for storage on a memory thereof) received from the personal wireless device 204. The beacon transmitter 100, when incorporated into the power tool 1100, may store within the memory 160 (see FIG. 1) identifying information for the power tool 1100, such as a product identifier (e.g., identifying the type of power tool) and a serial number (e.g., uniquely identifying the particular instance of the power tool). This identifying information of the power tool 1100 may also be provided by the beacon transmitter 100 as part of the beacon data transmitted with the second advertising beacon signal 414-422 noted above.

The power tool 1100, as illustrated in FIG. 11B, is a hammer drill/driver. However, the power tool 1100 is merely exemplary, and other power tools may have the beacon transmitter 100 incorporated therein. Additionally, other devices may have the beacon transmitter 100 incorporated therein, such as test and measurement equipment, battery packs (e.g., the power tool power supply 1102), vacuum cleaners, work site radios, outdoor power equipment, and vehicles. Such an incorporated beacon transmitter 100 may be powered by a battery of the device in which the beacon transmitter 100 is incorporated, similar to that which is described with respect to the power tool 1100.

Further, in some embodiments, the beacon transmitter 100 is incorporated into a repeater device that receives other beacon signals (e.g., similar to the beacon signals emitted by the beacon transmitter 100) and repeats (i.e., transmits) those beacon signals using beaconing techniques as described herein, such as described with respect to FIG. 3-6.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

Thus, the invention provides, among other things, a systems and methods for location logging of transmission devices. Various features and advantages of the invention are set forth in the following claims.

What is claimed is:

1. A personal wireless device comprising:
a network interface;
a display;
an electronic processor coupled to the network interface and to the display, the electronic processor configured to control the display to display a graphical user interface that simultaneously displays:
  a missing device button,
  an image of one of a first beacon transmitter and an object to which the first beacon transmitter is secured,
  a map showing a logged location of the first beacon transmitter,
  a timestamp associated with the logged location, and
  product information about the object to which the first beacon transmitter is secured;
wherein, in response to receiving a user input indicating that a user has selected the missing device button, the electronic processor is configured to transmit, via the network interface and to a location server, lost device information that indicates (i) an identity of the first beacon transmitter and (ii) that the first beacon transmitter is lost.

2. The personal wireless device of claim 1, wherein the missing device button is displayed on the graphical user interface above the map and below the image and the product information.

3. The personal wireless device of claim 1, wherein the product information includes a product name of the object, an assigned location of the object, and a person to whom the object is assigned.

4. The personal wireless device of claim 1, wherein, in response to receiving the user input indicating that the user has selected the missing device button, the electronic processor is configured to transmit, via the network interface and to the location server, first contact information of the personal wireless device to be stored by the location server such that user contact information associated with the first beacon transmitter is updated to include the first contact information of the personal wireless device that reported the first beacon transmitter as lost.

5. The personal wireless device of claim 1, wherein the electronic processor is configured to control the display to display the graphical user interface in response to a user selection of the first beacon transmitter on an inventory interface displayed on the display.

6. The personal wireless device of claim 1, wherein the electronic processor is configured to:
receive a beacon signal from a second beacon transmitter;
determine logged data associated with the second beacon transmitter, wherein the logged data includes (i) a transmitter identifier of the second beacon transmitter, (ii) a second timestamp of a time when the beacon signal was received from the second beacon transmitter, and (iii) a second location of the personal wireless device at the time when the beacon signal was received from the second beacon transmitter; and transmit, via the network interface, the logged data to the location server.

7. The personal wireless device of claim 6, wherein the electronic processor is configured to delay a time period after determining the logged data and before transmitting the logged data in order to limit data transmissions from the personal wireless device.

8. The personal wireless device of claim 7, wherein the electronic processor is configured to determine a time at which the personal wireless device transmits the logged data to the location server at least partially based on a time delay from a time at which the personal wireless device last transmitted other logged data associated with at least one of the group consisting of the first beacon transmitter, the second beacon transmitter, another beacon transmitter, and combinations thereof to the location server.

9. The personal wireless device of claim 7, wherein:
during the time period, the electronic processor is configured to:
receive a second beacon signal from a third beacon transmitter, and
determine second logged data associated with the third beacon transmitter, wherein the second logged data includes (i) a second transmitter identifier of the third beacon transmitter, (ii) a third timestamp of a second time when the second beacon signal was received from the third beacon transmitter, and (iii) a third location of the personal wireless device at the second time when the second beacon signal was received from the third beacon transmitter; and
wherein the electronic processor is configured to transmit bundled logged data to the location server in response to the time period elapsing, wherein the bundled logged data includes the logged data associated with the second beacon transmitter and the second logged data associated with the third beacon transmitter.

10. The personal wireless device of claim 9, wherein the second location and the third location are different.

11. A method of controlling a personal wireless device, the method comprising:
controlling, with an electronic processor of the personal wireless device, a display of the personal wireless device to display a graphical user interface that simultaneously displays:
a missing device button,
an image of one of a first beacon transmitter and an object to which the first beacon transmitter is secured,
a map showing a logged location of the first beacon transmitter,
a timestamp associated with the logged location, and
product information about the object to which the first beacon transmitter is secured;
receiving a user input indicating that a user has selected the missing device button; and
in response to receiving the user input indicating that the user has selected the missing device button, transmitting, via a network interface of the personal wireless device and to a location server, lost device information that indicates (i) an identity of the first beacon transmitter and (ii) that the first beacon transmitter is lost.

12. The method of claim 11, wherein the product information includes a product name of the object, an assigned location of the object, and a person to whom the object is assigned.

13. The method of claim 11, further comprising, in response to receiving the user input indicating that the user has selected the missing device button, transmitting, via the network interface and to the location server, first contact information of the personal wireless device to be stored by the location server such that user contact information associated with the first beacon transmitter is updated to include the first contact information of the personal wireless device that reported the first beacon transmitter as lost.

14. The method of claim 11, wherein controlling the display to display the graphical user interface includes controlling, with the electronic processor, the display to display the graphical user interface in response to a user selection of the first beacon transmitter on an inventory interface displayed on the display.

15. The method of claim 11, further comprising:
receiving, with the personal wireless device, a beacon signal from a second beacon transmitter;
determining, with the electronic processor, logged data associated with the second beacon transmitter, wherein the logged data includes (i) a transmitter identifier of the second beacon transmitter, (ii) a second timestamp of a time when the beacon signal was received from the second beacon transmitter, and (iii) a second location of the personal wireless device at the time when the beacon signal was received from the second beacon transmitter; and
transmitting, via the network interface, the logged data to the location server.

* * * * *